United States Patent

Aoki et al.

[11] Patent Number: 5,647,009
[45] Date of Patent: Jul. 8, 1997

[54] COMPUTER AIDED WORK SUPPORT SYSTEM AND METHOD

[75] Inventors: Toshiyuki Aoki; Kohji Kamejima, both of Ibaraki-ken; Tomoyuki Hamada, Abiko, all of Japan

[73] Assignee: Hitachi, Ltd., Tokyo, Japan

[21] Appl. No.: 137,973

[22] Filed: Oct. 19, 1993

[30] Foreign Application Priority Data

Oct. 20, 1992 [JP] Japan .................. 4-281315

[51] Int. Cl.$^6$ ............................................ G06K 9/00
[52] U.S. Cl. ............................................. 382/100
[58] Field of Search ..................... 382/1–8, 45, 46, 382/47, 57; 364/512, 550; 348/86, 94, 95; 395/135, 137, 138

[56] References Cited

U.S. PATENT DOCUMENTS

| | | | |
|---|---|---|---|
| 4,613,942 | 9/1986 | Chen | 348/86 |
| 4,628,453 | 12/1986 | Kamejima et al. | 364/424 |
| 4,654,872 | 3/1987 | Hisano et al. | 382/1 |
| 4,672,676 | 6/1987 | Linger | 382/8 |
| 4,831,546 | 5/1989 | Mitsuta et al. | 364/512 |
| 4,965,840 | 10/1990 | Subbarao | 382/1 |
| 5,006,991 | 4/1991 | Ohcoshi et al. | 364/512 |
| 5,027,417 | 6/1991 | Kitakado et al. | 382/8 |
| 5,048,094 | 9/1991 | Aoyama et al. | 382/8 |
| 5,073,952 | 12/1991 | Watanabe | 382/8 |
| 5,077,806 | 12/1991 | Peters et al. | 382/8 |
| 5,095,365 | 3/1992 | Takatoo et al. | 348/86 |
| 5,095,447 | 3/1992 | Manns et al. | 382/8 |
| 5,113,565 | 5/1992 | Cipolla et al. | 382/8 |
| 5,122,971 | 6/1992 | Kamejima et al. | 364/512 |
| 5,155,775 | 10/1992 | Brown | 382/1 |
| 5,179,642 | 1/1993 | Komatsu | 395/135 |
| 5,333,111 | 7/1994 | Chaiken et al. | 382/8 |
| 5,353,355 | 10/1994 | Takagi et al. | 382/8 |

FOREIGN PATENT DOCUMENTS 1-112309  1/1989  Japan .................. G05B 19/42

*Primary Examiner*—Jose L. Couso
*Attorney, Agent, or Firm*—Antonelli, Terry, Stout & Kraus

[57] ABSTRACT

A computer aided work support system having a measuring unit for measuring the position and orientation of the measuring unit itself; an image pickup unit for picking up an object to be measured; an unit for generating an estimated image of the object in accordance with information of the form, position, and orientation of the object, the position and orientation of the measuring unit, the position and orientation of the image pickup unit relative to the measuring unit, a plurality of image magnification factors, and the position of the optical axis of the image pickup unit on the screen of a display unit, the display unit displaying the picked-up image and estimated image of the object in a superposed manner at the same time; and a modifying unit for modifying the information of the previous positions and orientations of the object and image pickup unit in accordance with a displacement amount of the estimated image from the picked-up image.

15 Claims, 14 Drawing Sheets

COMPUTER AIDED WORK SUPPORT SYSTEM AND METHOD

BACKGROUND OF THE INVENTION

1. Field of the Invention

The present invention relates generally to a computer aided system and method for supporting a variety of work such as construction work and maintenance work of factory facilities and architectures. More particularly, the present invention relates to a computer aided work support system and method capable of correctly measuring the position and orientation of an object to be designed or maintained and improving the efficiency of work such as design and maintenance.

2. Description of the Related Art

In the construction and maintenance of a large structure such as a nuclear power plant and a factory facility, objects of an the structure each have a large error in actual installation positions. Therefore, measurement, re-design, and modification of each object of the structure have been repetitively performed until the errors in actual installation positions become within an allowable range. For the measurement of the position and orientation of each object of an the structure point measurement such as triangulation has been used, requiring a long time and much labor.

In a conventional technique as disclosed in U.S. Pat. No. 5,122,971, the image of an object of a structure is photographed at the construction site and matched with an estimated image of the object while both are displayed on the screen of a display unit, to measure the actual position and orientation of the object.

This technique of U.S. Pat. No. 5,122,971 discloses nothing about image pickup parameters used for displaying the image of an object of the structure on the display screen. The measurement precision necessary for design work cannot be attained from this technique, hindering the design work and making it impossible to rationalize the design work.

SUMMARY OF THE INVENTION

It is an object of the present invention to provide a computer aided work support system capable of rationalizing the design work.

The principal constitutional elements of the computer aided work support system according to the present invention include:

(1) a measuring unit for measuring the position and orientation of the measuring unit and the position of a point on a reference first object, the first object being used for the estimation of unknown parameters of an image pickup system;

(2) an image pickup unit for picking up the images of the first object and a second object to be measured;

(3) a storage unit for storing information of the form, position, and orientation of one of the first and second objects, the position and orientation of the measuring unit, the position and orientation of the image pickup unit relative to the measuring unit, a plurality of image magnification factors, and the position of the optical axis of the image pickup unit on the screen of a display unit;

(4) an input unit for inputting the form, position, and orientation of one of the first and second objects;

(5) an image pickup parameter calculating unit for calculating the position and orientation of the measuring unit, the position and orientation of the image pickup unit relative to the measuring unit, and the position of the optical axis of the image pickup unit on the screen of the display unit for each of the plurality of image magnification factors in accordance with the position of the image pickup unit relative to the measuring unit;

(6) an estimated image generating unit for generating an estimated image of one of the first and second objects in accordance with the calculation results obtained by the calculating unit and the information stored in the storage unit;

(7) the display unit for displaying the image picked up by the image pickup unit and the estimated image in a superposed manner at the same time on the screen of the display unit; and (8) an information modifying unit for detecting a displacement amount of the estimated image from the picked-up image displayed on the display unit, converting the displacement amount into a change amount of the position and orientation of one of the second object and the image pickup unit, and adding the change amount to data of the position and orientation of one of the second object and the image pickup unit stored in the storage unit.

The above-described units are controlled by one or a plurality of CPUs.

The work support system of the present invention measures the correct position and orientation of an object by the following steps including:

(a) picking up the image of an object to be measured, by using an image pickup unit;

(b) measuring the position and orientation of a measuring unit at an image pickup by the image pickup unit, by using the measuring unit itself;

(c) generating an estimated image of the object in accordance with design information of the object stored in advance in a storage unit, an image pickup parameter to be used for displaying the object on the screen of a display unit, and information of the position and orientation of the measuring unit obtained at the measuring step;

(d) displaying the estimated image and the image of the object picked up by the image pickup unit on the screen of the display unit in a superposed manner at the same time;

(e) moving the estimated image by inputting a signal to an information modifying unit to superpose the estimated image upon the image of the object; and (f) converting the motion amount of the estimated image superposed on the picked-up image into a change amount of the position and orientation of one of the object and the image pickup unit, and modifying data of the position and orientation of one of the object and the image pickup unit in accordance with the change amount.

The design information is information of the form, position, and orientation of an object, and the image pickup parameter is information of the position and orientation of the measuring unit, the position and orientation of the image pickup unit relative to the measuring unit, an image magnification factor of the whole image pickup system, and the position of the optical axis of the image pickup unit on the display screen.

With the above steps, the correct position and orientation of an object can be measured. The measured data is used for modifying the design information of the object, for designing a new object, for generating a instruction for maintenance work, and for generating an operation instruction for processing and assembling by a robot.

According to the present invention, from the estimation of image pickup parameters, the position and orientation of an object of a structure can be known at the precision necessary for the construction work. By matching the image of an object picked up at the construction site with the estimated image displayed on the display screen, it becomes possible to simulate at once the installed object of the structure.

According to the present invention, an object the same as designed can be manufactured by one processing work by using the measured data, dispensing with the dimension alignment work which might otherwise be performed frequently at the construction site. Accordingly, the design work can be considerably rationalized.

DESCRIPTION OF THE PREFERRED EMBODIMENTS

Figure 1:
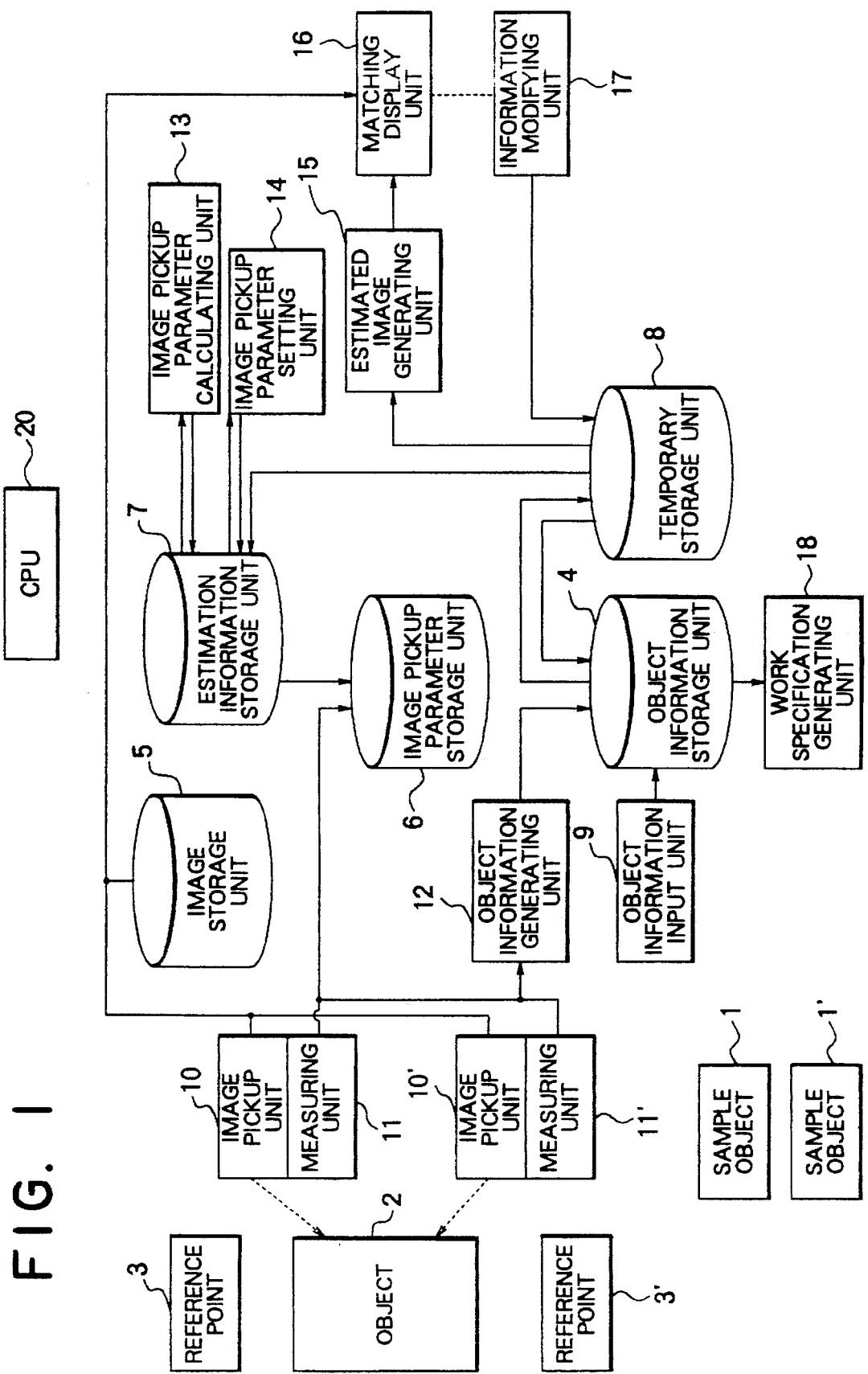
FIG. 1 is a block diagram showing the structure of a work support system according to an embodiment of the present invention.

FIG. 1 is a block diagram showing the structure of a computer aided work support system according to an embodiment of the present invention. In FIG. 1, reference numeral 1, 1' represents a sample object which is used for estimating image pickup parameters defining the image taking condition. In this embodiment, the sample object 1, 1' is a rectangular plate. The form of the sample object 1, 1' is not limited to the rectangular plate, but any other form may be used if the form of the sample object is known and the position and orientation of the sample object can be calculated from the measured points on the sample object. Reference numeral 2 represents an object to be measured, such as an object of a structure. Reference numeral 3, 3' represents a reference point on a coordinate system of a construction site.

In this embodiment, the computer aided work support system includes an object information storage unit 4, an image storage unit 5, an image pickup parameter storage unit 6, an estimation information storage unit 7, a temporary storage unit 8, an object information input unit 9 connected to the object information storage unit 4, an image pickup unit 10, 10' connected to the image storage unit 5, a measuring unit 11, 11' connected to the image pickup parameter storage unit 6, an object information generating unit 12 connected to the object information storage unit 4 and measuring unit 11, 11', an image pickup parameter setting unit 14 connected to the estimation information storage unit 7, an estimated image generating unit 15 connected to the temporary storage unit 8, a matching display unit 16 connected to the image storage unit 5, image pickup unit 10, 10', and estimated image generating unit 15, an information modifying unit 17 connected to the temporary storage unit 8, and a work specification generating unit 18 connected to the object information storage unit 4. Each unit is controlled by a CPU 20.

Image pickup parameters include the position and orientation of the measuring unit 11, 11', the position and orientation of the image pickup unit 10, 10' relative to the measuring unit 11, 11', the magnification factor of an image by the whole image pickup system, and the optical axis position of the image pickup means 10, 10' on the screen of the matching display unit 16.

The object information storage unit 4 stores data of the object 2 of a structure as design information, and data of the position, orientation, and form of the sample object 1, 1' to be used for the estimation of the image pickup parameters. The image storage unit 5 such as a video tape and a disk stores image data of the object 2 taken by the image pickup unit 10, 10' having the measuring unit 11, 11' at the construction site.

The image pickup parameter storage unit 6 stores the image pickup parameters. The estimation information storage unit 7 stores data used when estimating the image pickup parameters in the manner illustrated in FIG. 9A to 9C. The temporary storage unit 8 such as a memory stores the positions, orientations, and forms of the sample object 1, 1' and object 2, and other image pickup parameters.

The object information input unit 9 such as a keyboard and a mouse enters the position, orientation, and form of the object 2 of the structure as the design information.

The image pickup unit 10, 10' such as a camera takes the images of the object 2 and sample object 1, 1' and sends them to the image storage unit 5 or matching display unit 16.

The measuring unit 11, 11' such as an optical measuring device measures and records the position and orientation of the measuring unit 11, 11' and the positions of apexes of the sample object 1, 1' and sends the former to the image pickup parameter storage unit 6 and the latter to the object information generating unit 12.

The object information generating unit 12 calculates the position, orientation, and form of the sample object 1, 1' in accordance with the positions of apexes, and sends the calculated results to the object information storage unit 4.

The image pickup parameter setting unit 14 sets the image pickup parameters and transfers them to the estimation information storage unit 7. The image pickup parameters may be entered by an operator.

An image pickup parameter calculating unit 13 reads, for example, ten image magnification factors and ten corresponding positions of the image pickup unit 10, 10' relative to the measuring unit 11, 11' and ten corresponding positions of the optical axis of the image pickup unit 10, 10' on the screen from the estimation information storage unit 7, calculates correction values for the magnification factors and the positions, and transfers the correction values to the estimation information storage unit 7. The number of image magnification factors is not limited to ten, but any desired number of two or larger may be used. Image magnification factors are converged to a single magnification factor after the estimation of image pickup parameters.

The estimated image generating unit 15 reads the positions, orientations, and forms of the sample object 1, 1' and object 2 and the image pickup parameters from the temporary storage unit 8 and estimates the image of the object 2 to be picked up by the image pickup unit 10, 10'. The estimated image is transferred to the matching display unit 16.

The matching display unit 16 such as a CRT displays both the image sent from the image pickup unit 10, 10' or stored in the image storage unit 5, and the estimated image from the estimated image generating unit 15.

Next, the information modifying unit 17 such as a mouse is manipulated to move and superpose the estimated image upon the picked-up image. The amount the mouse is moved is detected and converted into a change amount of the position and orientation of the image pickup unit 10, 10' relative to the measuring unit 11, 11' or of the position and orientation of the object 2.

The work specification generating unit 18 generates a work specification in accordance with the design information stored in the object information storage unit 4 and the position and orientation of the measured object.

The work specification generating unit 18 may be replaced by a working unit such as a robot and a guiding unit. The guiding unit determines the operation information for the working unit in accordance with the design information stored in the object information storage unit 4, the position and orientation of the measured object, and an instruction from an operator. The working unit performs an actual work such as working and mounting the object 2 of the structure, in accordance with the working information transferred from the guiding unit. These units may be realized by using the structures described, for example, in U.S. Pat. No. 4,628,453 entitled "NAVIGATION APPARATUS FOR MOBILE SYSTEM", and JP-A-1-112309 entitled "ROBOT SUPPORTING SYSTEM".

In the embodiment shown in FIG. 1, the image pickup unit 10, 10', measuring unit 11, 11', and image storage unit 5 may be integrally structured as a portable unit controlled by a CPU to allow the image pickup and measurement to be performed at a construction site. This portable unit is thereafter connected to the work support system at the office to proceed with design work through pattern matching, estimation of image pickup parameters, measurement, and generation of a work specification. The portable unit assembled with the image pickup unit 10, 10', measuring unit 11, 11', and image storage unit 5 is light in weight and can be used at various construction sites freely, thereby speeding up the work at construction sites.

The operation of the above embodiment includes a design work, an image pickup parameter estimation work, a measurement work, and a work specification generation work. In the embodiment shown in FIG. 1, these four works can be performed independently of each other.

The procedure of estimating image pickup parameters will be described with reference to the flow chart shown in FIG. 2.

Figure 3:
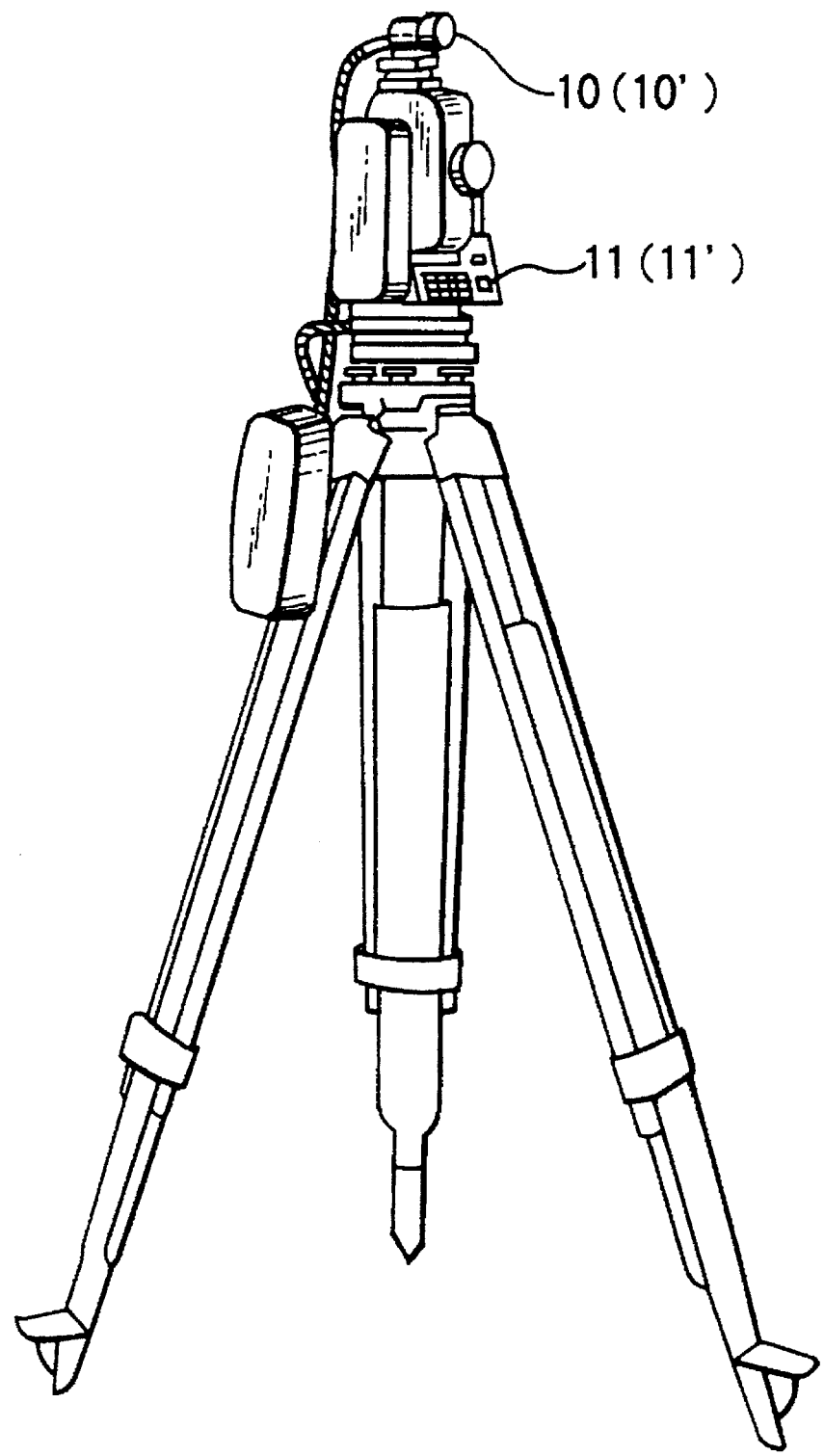
FIG. 3 is a perspective view showing the measuring unit and image pickup unit of the system shown in FIG. 1.

Step 1: As shown in FIG. 3, the image pickup unit 10, 10' is mounted on the measuring unit 11, 11', with the optical axes of the measuring unit 11, 11' and image pickup unit 10, 10' being parallel to each other.

Step 2: Two sample objects 1 and 1' are placed in front of the image pickup unit 10, 10' at different distances from the image pickup unit 10, 10'.

Step 3: The images of the two sample objects 1 and 1' are picked up by the image pickup unit 10, 10'. The images a and a' of the two sample objects are transferred from the image pickup unit 10, 10' to the image storage unit 5 and stored therein.

Step 4: While the images are being picked up, the (position and orientation) b of the measuring unit 11, 11' and the position c of each apex of the two sample objects 1 and 1' are measured by the measuring unit 11, 11'.

Step 5: The (position and orientation) b of the measuring unit 11, 11' are transferred to and stored in the image pickup parameter storage unit 6.

Step 6: The position c of each apex of the two sample objects 1 and 1' is transferred to the object information generating unit 12 which then calculates the (position, orientation, and form) d of the two sample objects 1 and 1' based upon the position c of each apex, the calculated results being stored in the object information storage unit 4.

Step 7: Through pattern matching, the position and orientation e of the image pickup unit 10, 10' relative to the measuring unit 11, 11' and the aspect ratio w by the total image magnification factor of the image pickup unit 10, 10' and matching display unit 16 are measured and temporarily stored in the estimation information storage unit 7.

Step 8: The image pickup parameter setting unit 14 sets an initial value f of the position of the optical axis of the image pickup unit 10, 10' on the screen and stores it in the estimation information unit 7.

Step 9: In accordance with the aspect ratio w stored in the estimation information storage unit 7, the image pickup parameter setting unit 14 sets ten different image magnification factors g and stores them in the estimation information storage unit 7. The image pickup parameters including the ten image magnification factors g stored in the estimation information storage unit 7 are transferred to and stored in the image pickup parameter storage unit 6. The number of image magnification factors is not limited to ten, but any desired number of two or more may be used. The image pickup parameters h are indicated by h=(e, $k_0$, g, f+$l_1 l_2$+, . . . , +$l_{n-1}$), where the value $k_0$ is an initial value of "k" and the values $l_1$+$l_2$+, . . . , +$l_{n-1}$ are later described at Step 11.

Step 10: Through pattern matching, the relative position and orientation i of the image pickup unit 10, 10' with respect to each of the ten image magnification factors and two sample objects 1 and 1' is measured and stored in the estimation information storage unit 7.

Step 11: The image pickup parameter calculating unit 13 reads the ten image magnification factors g and corresponding ten relative positions i, and calculates the correction value i for the magnification factor g, the correction value k for the relative position i, and the correction value $l_s$ for the position of the optical axis of the image pickup unit 10, 10' on the screen (where s represents the number of iterative calculations of image pickup parameters). The correction values are stored in the estimation information storage unit 7.

Step 12: The processes from Step 9 to Step 11 are repeated until a difference of the position i of the image pickup unit 10, 10' relative to the measuring unit 11, 11' between the two sample objects 1 and 1' becomes 0.5 mm or less in the vertical and horizontal directions. The value 0.5 mm may be set to a different value.

Step 13: The image pickup parameters (e, j, k, $l_1+l_2+$, . . ., $l\Sigma$, where $\Sigma$ represents the total number of iterative calculations of image pickup parameters) obtained when the difference of the relative position i becomes 0.5 mm or less at Step 12 are transferred from the estimation information storage unit 7 to the image pickup parameter storage unit 6 and stored therein.

Figure 4:
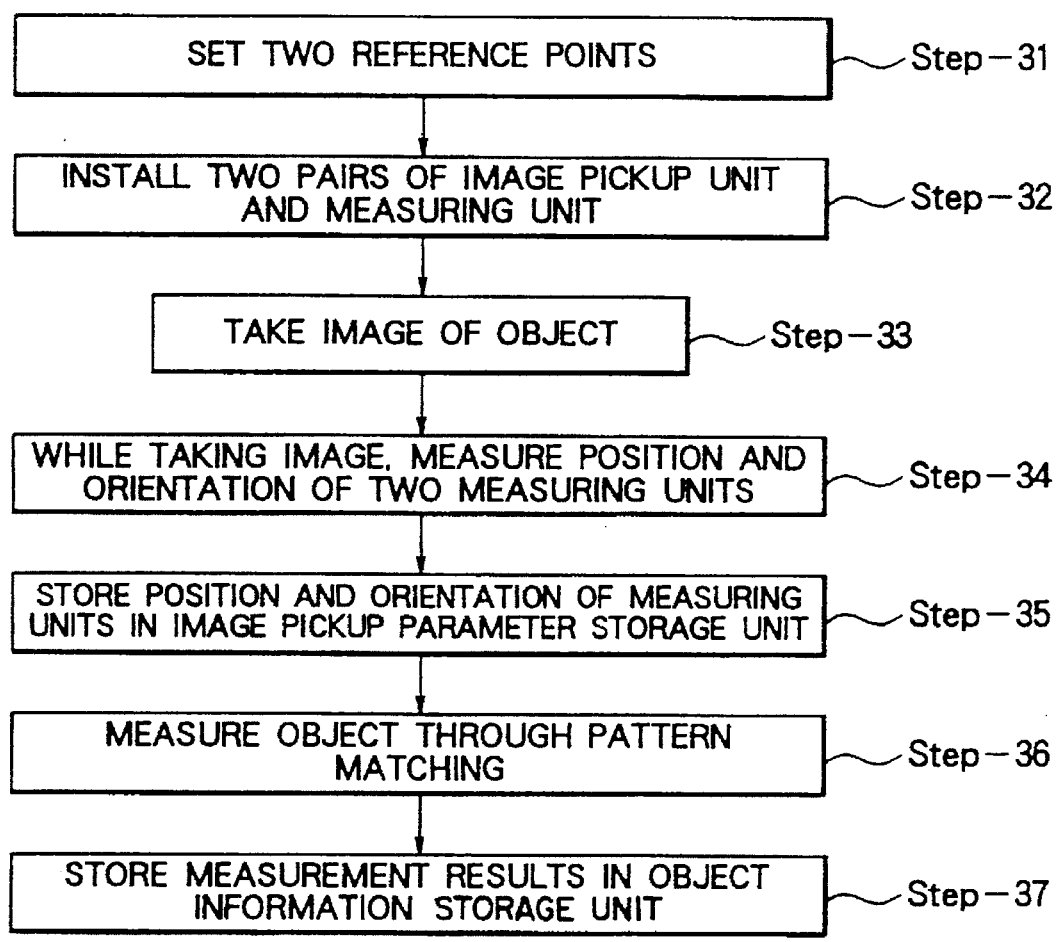
FIG. 4 is a flow chart explaining the measuring procedure to be executed by the system shown in FIG. 1.

The procedure of measurement will be described with reference to the flow chart shown in FIG. 4.

Step 31: Two reference points 3 and 3' (refer to FIG. 1) are set.

Step 32: Two pairs of the image pickup unit 10, 10' and measuring unit 11, 11' are set in front of the object 2. The angle between the optical axes of the two image pickup units 10 and 10' is preferably set to 90 degrees.

Step 33: The image of the object 2 is taken by the two image pickup units 10 and 10'. The images m and m' taken by the image pickup units 10 and 10' are stored in the image storage unit 5.

Step 34: While taking the images, the (positions and orientations) n and n' of the measuring units 11 and 11' are measured by using the measuring units 11 and 11'themselves, relative to the coordinate system defined by the two reference points 3 and 3'.

Step 35: The (positions and orientations) n and n' of the measuring units 11, 11' are transferred to and stored in the image pickup parameter storage unit 6.

Step 36: Through pattern matching, the (position and orientation) o of the object 2 are measured.

Step 37: The (position and orientation) o of the object 2 are transferred from the temporary storage unit 8 to the object information storage unit 4 and stored therein, when the image of the object 2 becomes coincident with and is superposed upon the estimated image of the object 2.

Although two pairs of the image pickup unit 10, 10' and measuring unit 11, 11' are used in the measurement procedure from Steps 31 to 37, the (position and orientation) of the object 2 can be measured either by a single pair of the image pickup unit and measuring unit in Steps 31 to 37, or by a plurality of pairs of the image pickup unit and measuring unit.

Figure 5A:
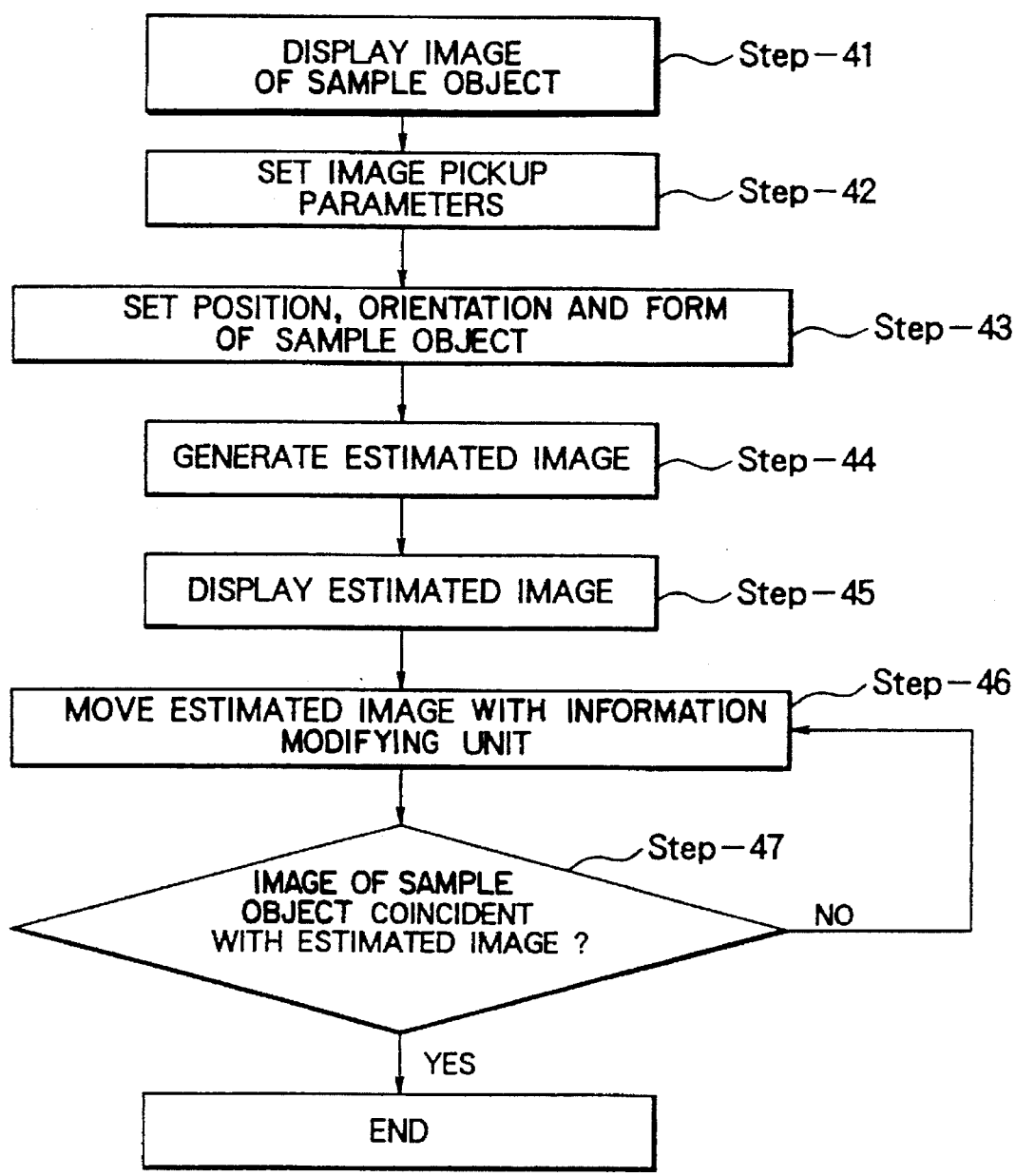
FIGS. 5A and 5B are flow charts explaining the pattern matching procedure to be executed by the system shown in FIG. 1.

The procedure of pattern matching for the image a in Step 7 of the image pickup parameter estimation procedure shown in FIG. 2 will be described with reference to the flow chart shown in FIG. 5A.

Step 41: The image a of the sample object 1 is transferred from the image storage unit 5 to the matching display unit 16 which in turn displays the image a of the sample object 1 on its screen.

Step 42: The image pickup parameters g=(b, $p_1$, $p_2$) are selected from the image pickup parameter storage unit 6. The value $p_1$ represents a position of the image pickup unit 10 relative to the measuring unit 11 and an initial value of the position of the optical axis of the image pickup unit 10 on the screen of the matching display unit 16, and the value $p_2$ represents an orientation of the image pickup unit 10 relative to the measuring unit 11 and an initial value of the image magnification factor. The image pickup parameters g are stored in the temporary storage unit 8.

Step 43: The (position, orientation, and form) d of the sample object 1 are selected from the object information storage unit 4 and stored in the temporary storage unit 8. Then, the (position, orientation, and form) d of the sample object 1 and the image pickup parameters g are transferred to the estimated image generating unit 15.

Step 44: From the (position, orientation, and form) d of the sample object and the image pickup parameters g, the estimated image generating unit 15 generates an estimated image $u_1$ and transfers it to the matching display unit 16.

Step 45: The matching display unit 16 displays the estimated image $u_1$ supplied from the estimated image generating unit 15 on the same window which displays the image a in a superposed manner.

Step 46: An operator manipulates the information modifying unit 17 to move the estimated image u$\omega$ ($\omega$ represents the number of repetitions of Step 46) to be superposed upon the image a of the sample object 1 displayed on the matching display unit 16. The amount the information modifying unit 17 is moved is detected and converted into a change amount v$\omega$+1 of the relative (position and orientation) of the image pickup unit 10 to the measuring unit 11. The (position and orientation) of the image pickup unit 10 relative to the measuring unit 11 to be changed are set by using the information modifying unit 17. The change amount v$\omega$+1 is added to the previous change amount and stored in the temporary storage unit 8. Then, the (position, orientation, and form) d of the sample object 1 and the image pickup parameters (b, $p_1$, $p_2=v_1+v_2+$. . .) stored in the temporary storage unit 8 are transferred to the estimated image generating unit 15. From the (position, orientation, and form) h of the sample object 1 and the image pickup parameters (b, $p_1$, $p_2=v_1+v_2+$. . .), the estimated image generating unit 15 generates an estimated image u$\omega$+1 which is displayed on the same window as the image a on the matching display unit 16.

Step 47: Step 46 is repeated until the estimated image u$\omega$+1 becomes coincident with the image a of the sample object 1 on the screen of the matching display unit 16.

Figure 2:
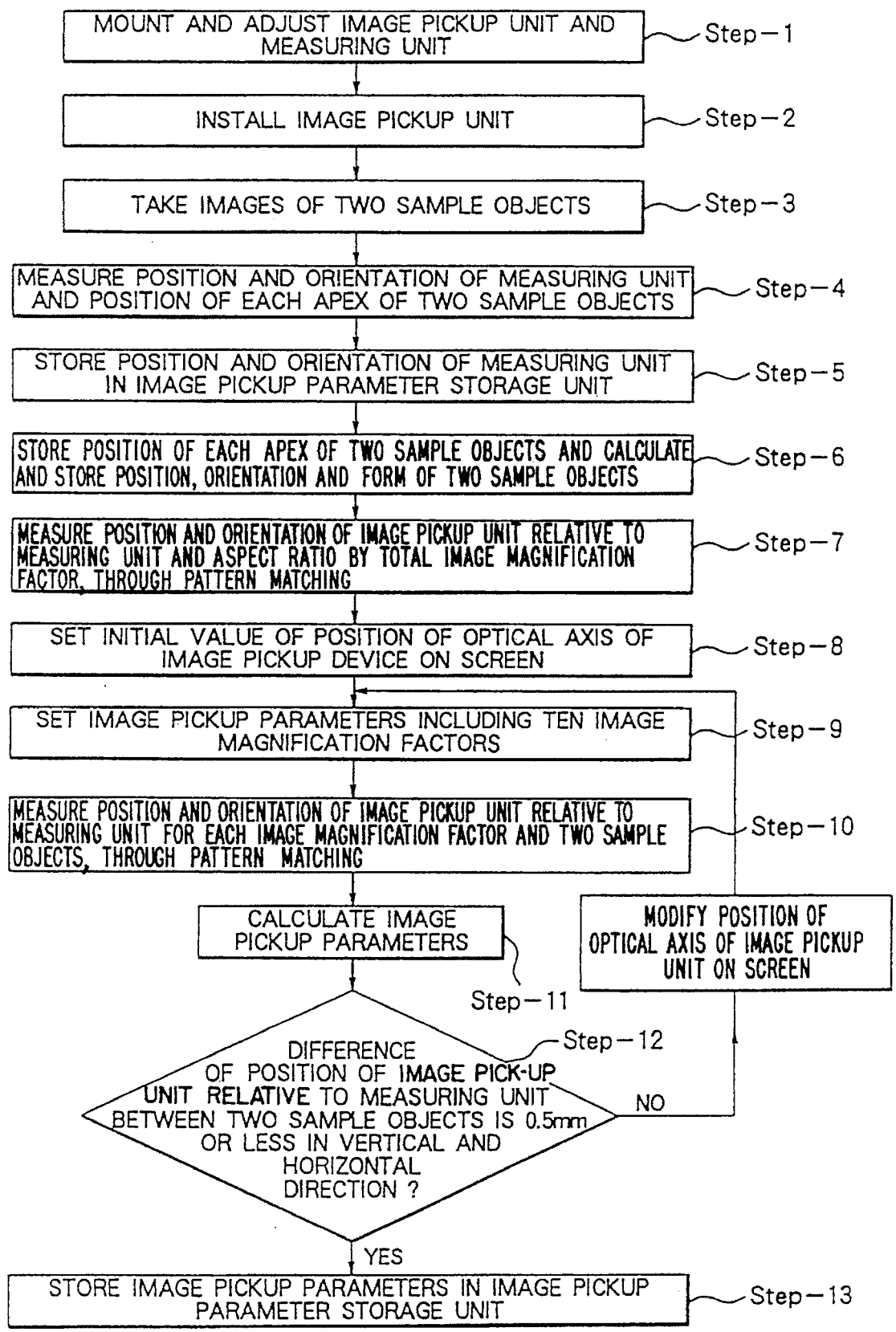
FIG. 2 is a flow chart explaining the procedure of estimating image pickup parameters to be executed by the system shown in FIG. 1.

The procedure of pattern matching for the image a' in Step 7 of the image pickup parameter estimation procedure shown in FIG. 2 is also performed at in Steps 41 to 47 in the manner described above.

The procedure of pattern matching for the image a in Step 10 of the image pickup parameter estimation procedure shown in FIG. 2 will be described with reference to the same flow chart shown in FIG. 5A. In this case, the image pickup parameters are different from those in Step 7.

Step 41: The image a of the sample object 1 is transferred from the image storage unit 5 to the matching display unit 16 which in turn displays the image a of the sample object 1 on its screen.

Step 42: The image pickup parameters r=(b, e, g, k, $f+l_1+l_2+$. . .) are selected from the image pickup parameter storage unit 6. The parameters r are transferred from the image pickup parameter storage unit 6 to the temporary storage unit 8 and temporarily stored therein.

Step 43: The (position, orientation, and form) d of the sample object 1 are selected from the object information storage unit 4 and stored in the temporary storage unit 8. Then, the (position, orientation, and form) d of the sample object 1 and the image pickup parameters g are transferred to the estimated image generating unit 15.

Step 44: From the (position, orientation, and form) d of the sample object 1 and the image pickup parameters g, the estimated image generating unit 15 generates an estimated image $u_1$ and transfers it to the matching display unit 16.

Step 45: The matching display unit 16 displays the estimated image $u_1$ on the same window which displays the image a in a superposed manner.

Step 46: An operator manipulates the information modifying unit 17 to move the estimated image $u\omega$ ($\omega$ represents the number of repetitions of Step 46) to be superposed upon the image a of the sample object 1 displayed on the matching display unit 16. The amount the information modifying unit 17 is moved is detected and converted into a change amount $v\omega+1$ of the (position and orientation) of the image pickup unit 10 relative to the measuring unit 11. The (position and orientation) of the image pickup unit 10 relative to the measuring unit 11 to be changed are set by using the information modifying unit 17. The change amount $v\omega+1$ is added to the previous change amount and stored in the temporary storage unit 8. Then, the (position, orientation, and form) d of the sample object 1 and the image pickup parameters $(b+v_1+v_2+\ldots, e, g, k, f+l_1+l_2+\ldots)$ stored in the temporary storage unit 8 are transferred to the estimated image generating unit 15. From the (position, orientation, and form) d of the sample object 1 and the image pickup parameters $(b+v_1+v_2+\ldots, e, g, k, f+l_1+l_2+\ldots)$, the estimated image generating unit 15 generates an estimated image $u\omega+1$ which is displayed on the same window as the image a on the matching display unit 16.

Step 47: Step 46 is repeated until the estimated image $u\omega+1$ becomes coincident with the image a of the sample object 1 on the screen of the matching display unit 16.

The procedure of pattern matching for the image a' in Step 10 of the image pickup parameter estimation procedure shown in FIG. 2 is also performed in Steps 41 to 47 in the manner described above.

Figure 5B:
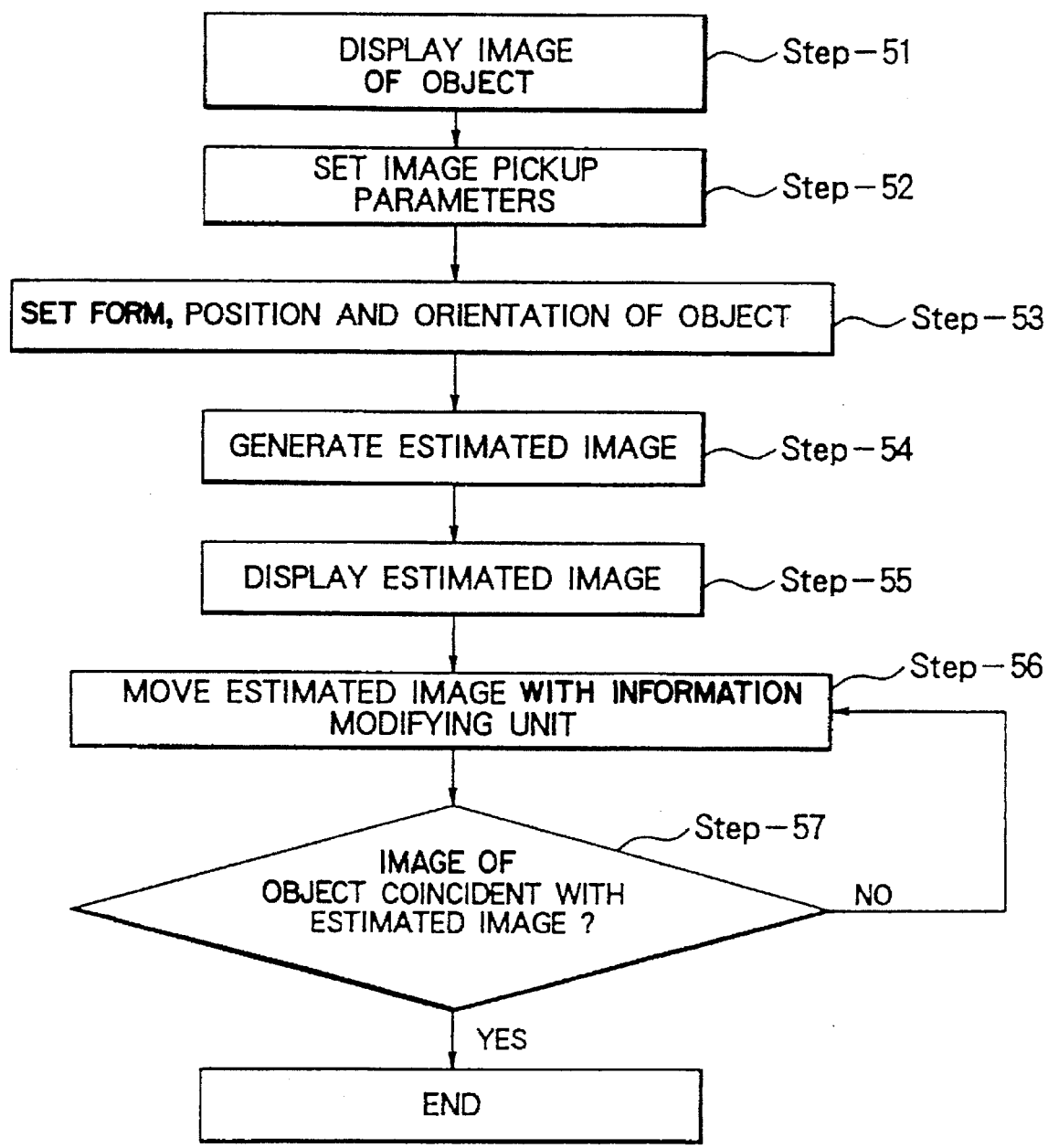

The procedure of pattern matching for the image a in Step 36 of the measurement procedure shown in FIG. 4 will be described with reference to the flow chart shown in FIG. 5B.

Step 51: The image m of the object 2 taken by the image pickup unit 10 and the image m' of the object taken by the image pickup unit 10' are transferred from the image storage unit 5 to the matching display unit 16 which in turn displays the images m and m' of the object 2 on its screen.

Step 52: The image pickup parameters $s=(b, e, j, k, f+l_1+l_2+\ldots)$ of the image pickup unit 10 and measuring unit 11 and the image pickup parameters $s'=(b', e', j', k', f'+l_1+l_2, +\ldots)$ of the image pickup unit 10' and measuring unit 11' are selected from the image pickup parameter storage unit 6. The image pickup parameters s and s' are transferred from the image pickup parameter storage unit 6 to the temporary storage unit 8 and stored therein.

Step 53: The (form $t_1$ and (position and orientation) $t_2$) of the object 2 are selected from the object information storage unit 4 and stored in the temporary storage unit 8. Then, the (form $t_1$ and (position and orientation) $t_2$) of the object 2 and the image pickup parameters s are transferred to the estimated image generating unit 15.

Step 54: From the (form $t_1$ and (position and orientation) $t_2$) of the object 2 and the image pickup parameters s, the estimated image generating unit 15 generates an estimated image $u_1$ and transfers it to the matching display unit 16. From the (form $t_1$ and (position and orientation) $t_2$) of the object 2 and the image pickup parameters s', the estimated image generating unit 15 generates an estimated image $u_1'$ and transfers it to the matching display unit 16.

Step 55: The matching display unit 16 displays the estimated image $u_1$ on the same window which displays the image m in a superposed manner. The matching display unit 16 displays the estimated image $u_1'$ on the same window which displays the image m' in a superposed manner.

Step 56: An operator manipulates the information modifying unit 17 to move the estimated images $u\omega$ ($\omega$ represents the number of repetitions of Step 56) and $u\omega'$ to be superposed upon the images m and m' of the object 2 displayed on the matching display unit 16. The amount the information modifying unit 17 is moved is detected and converted into a change amount $v\omega+1$ of the (position and orientation) $t_2$ of the object 2. The (position and orientation) $t_2$ of the object 2 to be changed are set by using the information modifying unit 17. The change amount $v\omega+1$ is added to the previous change amount and stored in the temporary storage unit 8. Then, the (form $t_1$ and (position and orientation) $t_2+v_1+v_2+\ldots$) of the object 2 and the image pickup parameters s and s' are transferred to the estimated image generating unit 15. From the (form $t_1$ and (position and orientation) $t_2+v_1+v_2+\ldots$) of the object 2 and the image pickup parameters s and s', the estimated image generating unit 15 generates estimated images $u\omega+1$ and $u\omega+1'$. The matching display unit 16 displays the estimated image $u\omega+1$ on the window of the image m in a superposed manner, and displays the estimated image $u\omega+1'$ on the window of the image m' in a superposed manner.

Step 57: Step 56 is repeated until the estimated images $u\omega+1$ and $u\omega+1'$ become coincident with the images m and m' of the object 2 on the screen of the matching display unit 16.

As an operator moves the information modifying unit 17 in Steps 46 and 56, the estimated image of the object on the screen of the matching display unit 16 moves by an amount corresponding to the amount of the movement of the information modifying unit 17. Therefore, the estimated image of the object can be moved as intended by the operator. If the estimated image is superposed upon an image taken at the construction site and displayed on the screen of the matching display unit 16, the condition of the object 2 of the structure at the construction site can be simulated at once, rationalizing the design work. If the system shown in FIG. 1 is installed at the construction site, the construction work of the object 2 of the structure can be performed while looking at the matching display unit 16, allowing the object 2 of the structure to be constructed at once in the manner as designed. A work specification can be made at once, and the position information of the object of the structure for the construction and modifying work by a robot can be provided at once, reducing the man power required.

With the work support system according to the present invention, the image pickup parameters are obtained by using the images a and a' of the sample objects 1 and 1' and then the measurement is performed. The measured values are compared with the (position, orientation, and form) d to obtain a difference therebetween. Since the object within the field of view can be measured from the picked-up images m and m', a repair work can be planned easily.

A designer designs an object of a structure while determining construction precision and considering construction error, for construction work having a large error in actual dimensions. In this manner, the designer can proceed with the design work even for the construction having a large error in actual dimensions. The construction work is carried out at the construction site in accordance with the design work. After the construction work, the image of the object 2 of an architecture is taken by the image pickup units 10 and 10'. Using the work support system shown in FIG. 1, the designer can obtain the position and orientation of the object 2 of a structure from the images m and m' taken at the construction site, and can know the conditions of the structure at once. In this manner, a highly precise design can be made at once in accordance with the information of the object 2 of the structure. In this manner, a design can be performed and the construction work can be carried out efficiently even for construction work having a large error in actual dimensions.

From the estimation of the image pickup parameters as described with respect to FIG. 2, the position and orientation of the object of a structure can be provided at a precision necessary for the construction work.

At the construction site, the measuring unit 11, 11' and image pickup unit 10, 10' are mounted as shown in FIG. 3 to establish the position and orientation of the image pickup unit 10, 10'. Once the image pickup parameters are obtained in the manner described with respect to FIG. 2, it is not necessary to change the image pickup parameters at each image pickup.

Figure 6:
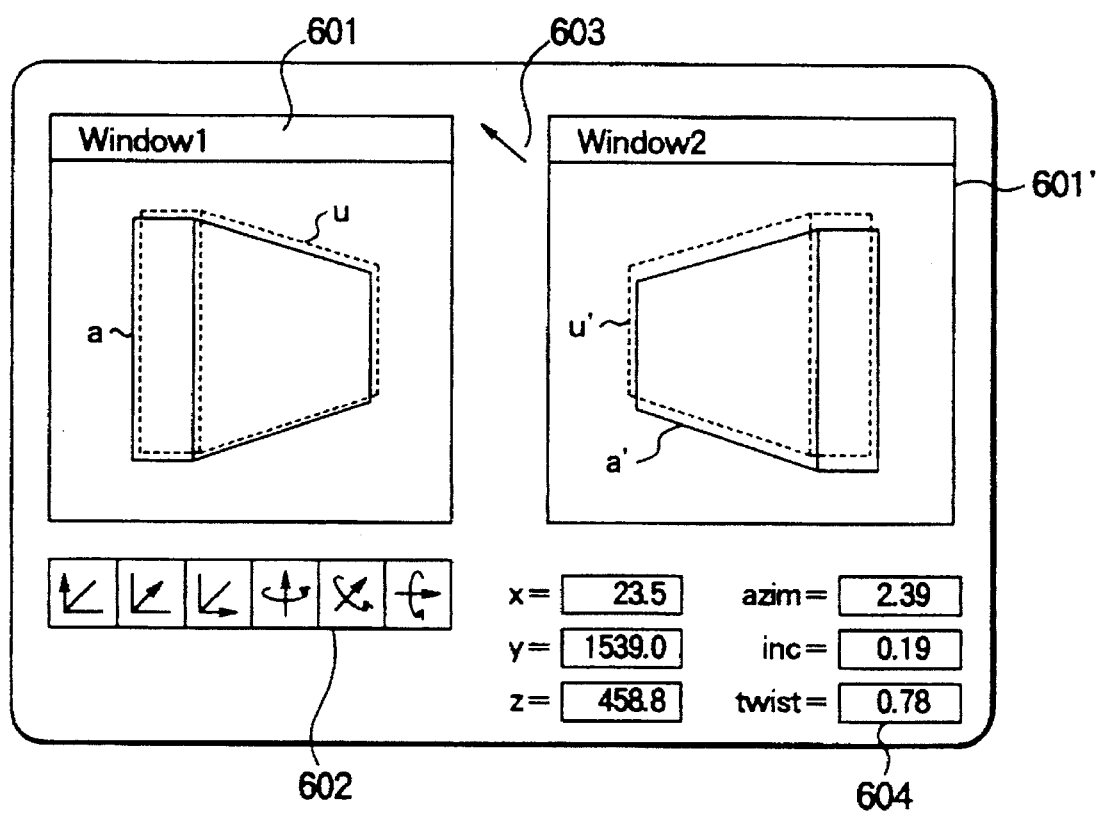
FIG. 6 is a diagram showing an example of the layout of the display screen of the matching display unit of the system shown in FIG. 1.

An example of the layout of the screen of the matching display unit 16 will be described with reference to FIG. 6. The matching display unit 16 displays two windows 601 and 601' on the screen. The unit 16 displays switch buttons 602 for selecting the (position and orientation) of the image pickup unit 10, 10' relative to the measuring unit 11, 11' or the (position and orientation) of the object 2, the switch buttons being actuated by the information modifying unit 17. A pointer 603 is displayed on the screen and moves following the movement of the information modifying unit 17. The values 604 of the (position and orientation) of the object 2 and image pickup parameters are also displayed.

The switch buttons 602 and the (position and orientation) values 604 of the object are not necessarily required to be displayed.

For the estimation of the image pickup parameters, the images a and a' of the two sample objects 1 and 1' and the estimated images u and u' are displayed at the same time on the two windows 601 and 601'

As the information modifying unit 17 is moved, one of the estimated image u or u' moves in the corresponding window. The selection between the estimated images u and u' to be moved is made by using the information modifying unit 17.

During the measurement, the estimated images u and u' are superposed upon the images m and m' of the object 2 taken by the image pickup units 10 and 10' at the same time on the two windows 601 and 601'. As the information modifying unit 17 is moved, the estimated images u and u' on the two windows 601 and 601' move at the same time.

If the switch buttons 602 are displayed, the matching display unit 16 is connected to the information modifying unit 17. In selecting the (position and orientation) of the image pickup unit 10, 10' relative to the measuring unit 11, 11' or the (position and orientation) of the object, the corresponding switch button 602 is selected by moving the information modifying unit 17 to make the mark pointer indicate the button 602.

Figure 7:
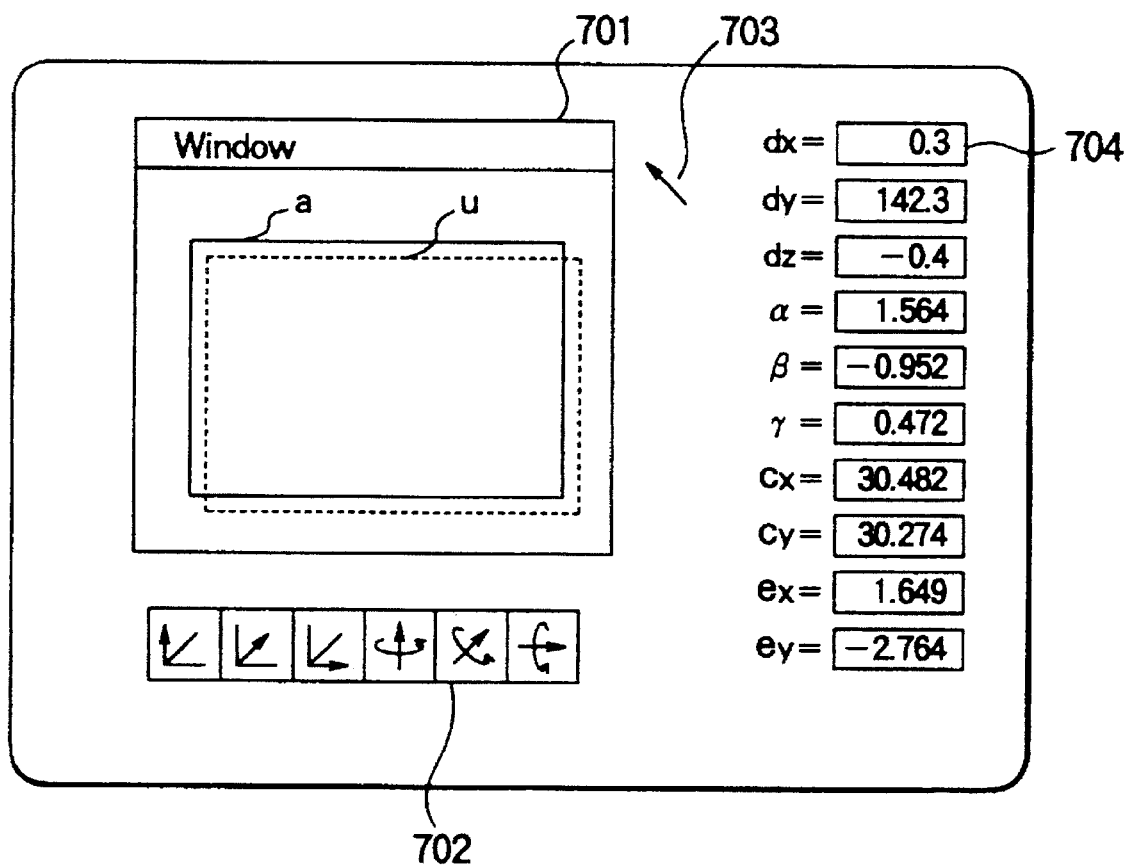
FIG. 7 is a diagram showing another example of the layout of the display screen of the matching display unit of the system shown in FIG. 1.

Another example of the layout of the screen of the matching display unit 16 will be described with reference to FIG. 7. The matching display unit 16 displays, on its screen, one window 701, switch buttons 702 for selecting the (position and orientation) of the image pickup unit 10, 10' relative to the measuring unit 11, 11', the switch buttons being actuated by the information modifying unit 17, and a pointer 703 which moves following the movement of the information modifying unit 17, and the values 704 of the image pickup parameters.

The switch buttons 702, pointer 703, and image pickup parameter values 704 are not necessarily required to be displayed. This screen layout is used for the estimation of the image pickup parameters. The image of two sample objects or one sample object and the estimated image are displayed on the window 701 at the same time. In FIG. 7, the image a of one sample object 1 and the estimated image u are displayed illustratively.

If the switch buttons 702 are to be displayed, the matching display unit 16 is connected to the information modifying unit 17. In selecting the (position and orientation) of the image pickup unit 10, 10' relative to the measuring unit 11, 11', the corresponding switch button 702 is selected by moving the information modifying unit 17 to make the pointer 703 indicate the button 702.

Next, the design procedure will be described. By using the object information input unit 9, the (form $t_1$ and (position and orientation) $t_2$) of the object 2 of a structure are inputted as the design information. The (form $t_1$ and (position and orientation) $t_2$) of the object 2 of the structure are transferred from the object information input unit 9 to the object information storage unit 4 and stored therein. If necessary, an operator may display the estimated image u and the image m on the matching display unit 16 and proceed with a design work while moving the estimated image u with the information modifying unit 17.

The procedure of forming a work specification will be described. The design information and the measured (position and orientation) of the object 2 are transferred from the object information storage unit 4 to the work specification generating unit 18 which in turn forms a work specification in accordance with the transferred information and outputs it.

Next, the calculation of the image pickup parameters in Step 11 of the image pickup estimation procedure shown in FIG. 2 along with its principle will be described.

First, a numerical model of an image pickup process is derived.

Since the (position and orientation) of a camera (image pickup unit) change with each image pickup, the assembly of an image pickup unit and a measuring device (measuring unit) is used as shown in FIG. 3.

The image pickup unit shown in FIG. 3 takes an image by the following process. An image of an object is geometrically converted when light is received from the object. This conversion depends upon the position and size of the lens and a light receiving device. Next, the image is converted into an electrical signal and displayed on a display unit. At this stage, the image is electrically deformed. The above image forming process is modeled as in the following.

In the embodiment work support system, the center of the measuring unit is different from that of the image pickup unit. Using this difference (camera offset), the conversion of the measuring coordinates into the camera coordinates can be expressed by the following equation. The measuring coordinate system and camera coordinate system are both the rectangular three-dimensional coordinate system.

$$\begin{bmatrix} x_m \\ y_m \\ z_m \\ 1 \end{bmatrix} = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix} \times \quad \text{(Eq. 1)}$$

-continued $$\begin{bmatrix} \cos\gamma & -\sin\gamma & 0 & 0 \\ \sin\gamma & \cos\gamma & 0 & 0 \\ 0 & 0 & 1 & 0 \\ 0 & 0 & 0 & 1 \end{bmatrix} \begin{bmatrix} 1 & 0 & 0 & e_{mx} \\ 0 & 1 & 0 & e_{my} \\ 0 & 0 & 1 & e_{mz} \\ 0 & 0 & 0 & 1 \end{bmatrix} \begin{bmatrix} x_a \\ y_a \\ z_a \\ 1 \end{bmatrix}$$

where $x_a$, $y_a$, and $z_a$ represent the position of an object in the measuring coordinate system, $x_m$, $y_m$, and $z_m$ represent the position of an object in the camera coordinate system, $\alpha$, $\beta$, and $\gamma$ represent a camera orientation offset in the measuring coordinate system, and $e_{mx}$, $e_{my}$, and $e_{mz}$ represent a camera position offset in the measuring coordinate system. In the work support system, the angle offset ($\alpha$, $\beta$) is set to zero. Assuming that the lens has no distortion, the position ($x_r$, $y_r$) of an image on the light receiving device is obtained from the following equation.

$$\begin{bmatrix} x_r \\ y_r \\ 1 \end{bmatrix} = \begin{bmatrix} c_{rx} & 0 & 0 \\ 0 & c_{ry} & 0 \\ 0 & 0 & 1 \end{bmatrix} \begin{bmatrix} \frac{x_m}{z_m} \\ \frac{y_m}{z_m} \\ \frac{c_m}{1} \end{bmatrix} \quad \text{(Eq. 2)}$$

where $c_{rx}$ and $c_{ry}$ represent the lens magnification factors in the x- and y-directions, and $x_r$ and $y_r$ represent the rectangular two-dimensional coordinates on the surface of the light receiving device.

Taking into consideration the displacement of the light receiving device relative to the lens, the position ($x_s$, $y_s$) of an image outputted from the light receiving device is given by the following equation.

$$\begin{bmatrix} x_s \\ y_s \\ 1 \end{bmatrix} = \begin{bmatrix} 1 & 0 & e_{sx} \\ 0 & 1 & e_{sy} \\ 0 & 0 & 1 \end{bmatrix} \begin{bmatrix} x_r \\ y_r \\ 1 \end{bmatrix} \quad \text{(Eq. 3)}$$

where $e_{sx}$ and $e_{sy}$ represent a displacement of the center of the light receiving device from the camera optical axis. An image on the light receiving device is photoelectrically converted and electrically processed, and stored in a memory of a workstation. During such a conversion, the center of an image displaces is displaced and the magnification factor changes. In such a case, the position ($x_i$, $y_i$) of an image on a display screen is given by the following equation.

$$\begin{bmatrix} x_i \\ y_i \\ 1 \end{bmatrix} = \begin{bmatrix} c_{ix} & 0 & 0 \\ 0 & c_{iy} & 0 \\ 0 & 0 & 1 \end{bmatrix} \begin{bmatrix} 1 & 0 & e_{ix} \\ 0 & 1 & e_{iy} \\ 0 & 0 & 1 \end{bmatrix} \begin{bmatrix} x_s \\ y_s \\ 1 \end{bmatrix} \quad \text{(Eq. 4)}$$

where $x_i$ and $y_i$ represent the rectangular two-dimensional coordinates of an image on the display screen, $e_{ix}$ and $e_{iy}$ represent displacements of the center of the light receiving device from that of the image, and $c_{ix}$ and $c_{iy}$ represent magnification factors between the image on the light receiving device and the image on the display screen. In the work support system, an image is stored in the memory of the workstation and matched with a wire frame image (estimated image) stored in the same memory. The wire frame image is an estimated image of an object to be picked up by the camera. Therefore, the distortion of a CRT is not required principally to be taken into consideration. In summary, the following equations are obtained.

$$\begin{bmatrix} x_m \\ y_m \\ z_m \\ 1 \end{bmatrix} = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix} \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix} \times \quad \text{(Eq. 5)}$$

$$\begin{bmatrix} \cos\gamma & -\sin\gamma & 0 & 0 \\ \sin\gamma & \cos\gamma & 0 & 0 \\ 0 & 0 & 1 & 0 \\ 0 & 0 & 0 & 1 \end{bmatrix} \begin{bmatrix} 1 & 0 & 0 & e_{mx} \\ 0 & 1 & 0 & e_{my} \\ 0 & 0 & 1 & e_{mz} \\ 0 & 0 & 0 & 1 \end{bmatrix} \begin{bmatrix} x_a \\ y_a \\ z_a \\ 1 \end{bmatrix}$$

$$\begin{bmatrix} x_i \\ y_i \\ 1 \end{bmatrix} = \begin{bmatrix} 1 & 0 & e_x \\ 0 & 1 & e_y \\ 0 & 0 & 1 \end{bmatrix} \begin{bmatrix} c_x & 0 & 0 \\ 0 & c_y & 0 \\ 0 & 0 & 1 \end{bmatrix} \begin{bmatrix} \frac{x_m}{z_m} \\ \frac{y_m}{z_m} \\ 1 \end{bmatrix} \quad \text{(Eq. 6)}$$

where $c_x$ and $c_y$ represent total magnification factors due to a combination of the lens, photoelectric conversion, and electric conversion, and $e_x$ and $e_y$ represent displacements of an optical axis in the screen coordinate system. These parameters change with the assembly condition of the image pickup unit. The strict management of the image pickup unit under a construction/maintenance work environment is difficult in practice. Therefore, the parameters $e_{mx}$, $e_{my}$, $e_{mz}$, $\alpha$, $\beta$, $\gamma$, $c_x$, $c_y$, $e_x$, and $e_y$ are considered unknown according to the present invention.

The unknown parameters $e_{mx}$, $e_{my}$, and $e_{mz}$ of the equation (5) depend on the maintenance condition of the measuring system so that the precision management of these parameters is difficult.

The parameters $c_x$ and $c_y$ of the equation (6) depend on the electrical displacement of an image and are predicted to change with the combination of the camera and workstation. The parameters $\alpha$, $\beta$, and $\gamma$ of the equation (5) and $e_x$ and $e_y$ of the equation (6) depend only on the assembly precision of the camera, and so it can be considered that these parameters have a relatively small error.

According to the present invention, the parameters $\alpha$ and $\beta$ are identified by including them in $e_x$ and $e_y$. An error caused by the inclusion of $\alpha$ and $\beta$ in $e_x$ and $e_y$ will be evaluated by the equation (10) below. The parameter $\gamma$ is obtained by making the wire frame image coincide with the image of an object.

By handling the unknown parameters in the above manner, the model of the image pickup process at the equation (5) can be simplified to the following equations.

$$\begin{bmatrix} x_m \\ y_m \\ z_m \\ 1 \end{bmatrix} = \begin{bmatrix} 1 & 0 & 0 & e_{mx} \\ 0 & 1 & 0 & e_{my} \\ 0 & 0 & 1 & e_{mz} \\ 0 & 0 & 0 & 1 \end{bmatrix} \begin{bmatrix} x_a \\ y_a \\ z_a \\ 1 \end{bmatrix} \quad \text{(Eq. 7)}$$

$$\begin{bmatrix} x_i \\ y_i \\ 1 \end{bmatrix} = \begin{bmatrix} 1 & 0 & e_x \\ 0 & 1 & e_y \\ 0 & 0 & 1 \end{bmatrix} \begin{bmatrix} c_x & 0 & 0 \\ 0 & c_y & 0 \\ 0 & 0 & 1 \end{bmatrix} \begin{bmatrix} \frac{x_m}{z_m} \\ \frac{y_m}{z_m} \\ 1 \end{bmatrix} \quad \text{(Eq. 8)}$$

The unknown parameters $\Theta$ are therefore $\Theta = (e_{mx}, e_{my}, e_{mz}, c_x, c_y, e_x, e_y)$.

Under the ordinary measuring condition, it can be expected that the displacement angle between the camera optical axis and the measuring unit optical axis is sufficiently small. From this point, the parameter $e_x$ of the equations (6) can be replaced by $t_{tx}$ given by the following equation.

$$e_{t x}=e_x+c_x\tan\alpha \qquad \text{(Eq. 5)}$$

where $\alpha$ represents the displacement angle. The measurement error $er_\alpha$ at a maximum between the screen center and the screen periphery is given by the following equation.

$$er_\alpha = \left| z_m \left( \frac{\tan(\theta_s/2)\cdot\cos\alpha + \sin\alpha}{-\tan(\theta_s/2)\cdot\sin\alpha + \cos\alpha} - \tan(\theta_s/2) - \tan\alpha \right) \right| \qquad \text{(Eq. 10)}$$

where $\Theta_s$ represents an angle of view of the camera. Assuming that $\Theta_s=20$ degrees, $z_m=5000$ mm, and $\alpha=0.1$ degree, the measurement error is 0.27 mm. The error caused by the replacement in the equation is in an allowable range under an ordinary construction work environment.

The image pickup process can be simulated by using the equations (7) and (8). In other words, the wire frame image of an object generated by using the equations (7) and (8) is superposed on the object image so that the position and orientation of the image pickup unit relative to the object can be detected. From this point, the unknown parameters of the equations (7) and (8) are identified according to the present invention.

The following two principles are satisfied when the wire frame image of an object is superposed upon the object image.

(1) The object image having a known position and orientation becomes coincident with the wire frame image generated by using the same condition.

Figure 8:
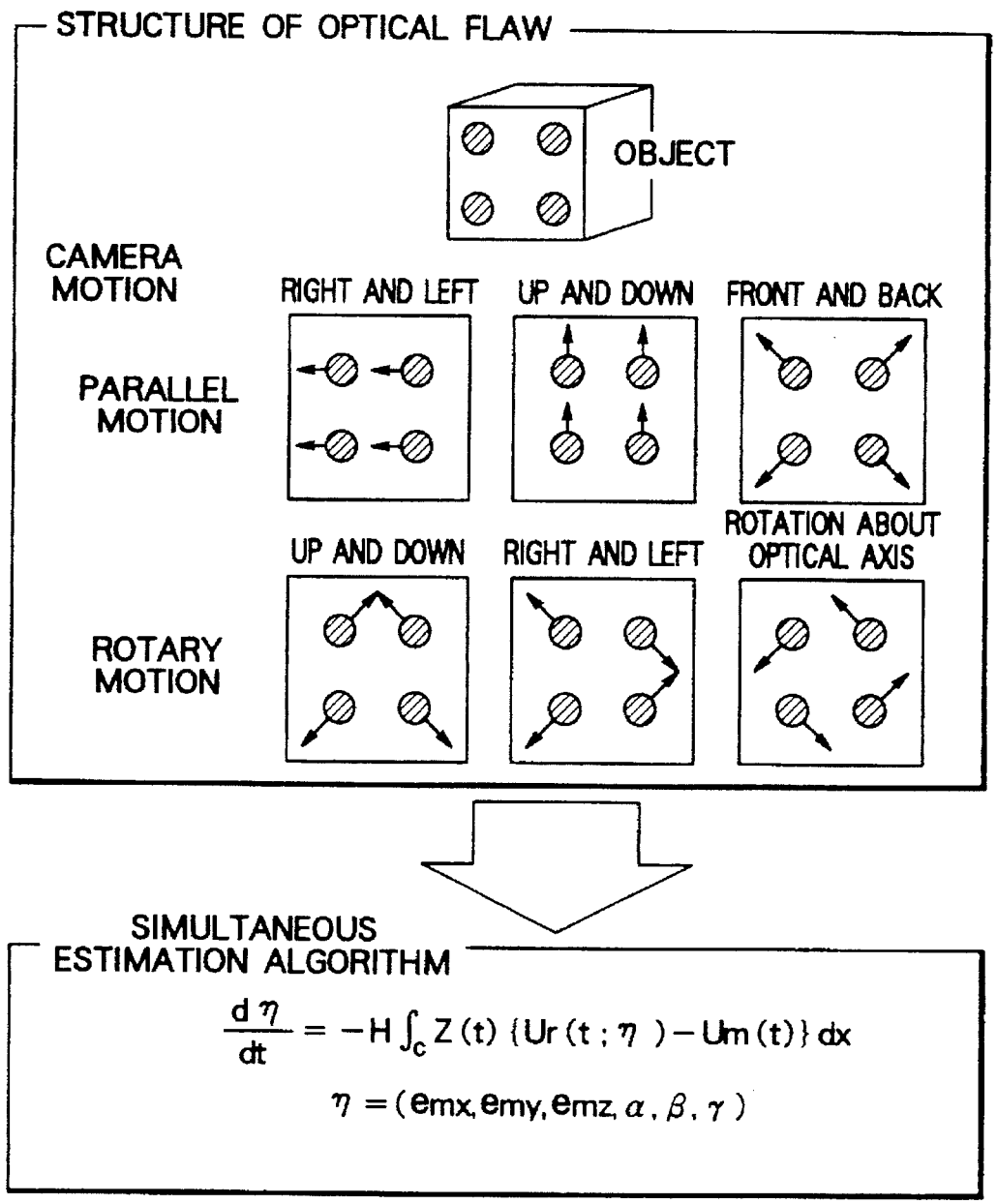
FIG. 8 is a diagram illustrating an example of the structure of an optical flaw to be used by the system shown in FIG. 1.

(2) As the position and orientation of the camera change, the displacement between the wire frame image and the object image shows a specific pattern (refer to FIG. 8).

As the position and orientation of the camera change relative to the object, a specific image distortion is generated in accordance with the motion type of the camera, as shown in FIG. 8. This distortion is called an optical flaw. If the optical flaw can be identified, the amount of motion $d\eta/dt$ of the camera can be calculated from the optical flaw. In the equation shown in FIG. 8, $Z(t)$ represents an optical flaw, $u_m$ and $u_r$ represent diffused images for the object image and object model or estimated image H represents a gain matrix, and c represents a screen area.

A method of identifying the image pickup process model equations (7) and (8) in accordance with the above principles will be discussed. A problem to be solved is to obtain the parameters $\Theta=(e_{mx}, e_{my}, e_{mz}, c_x, c_y, e_x, e_y)$ by giving $x_a$, $y_a$, $z_a$, and $x_i$, $y_i$, i.e., by using an object image having a known form and known position and orientation.

The equations (7) and (8) indicate that $x_i$ and $y_i$ nonlinearly depend on unknown parameters. Under such a condition, estimation of parameters is difficult. Practically, the wire frame image displaces similar to a change of the parameters $e_{mx}$ and $e_x$, and $e_{my}$ and $e_y$. Therefore, separation between $e_{mx}$ and $e_x$ and between $e_{my}$ and $e_y$ is difficult during the matching process. According to the present invention, the unknown parameters are separated and estimated through iterative calculations.

The principle of the iterative calculations of the present invention will be described with reference to FIGS. 9A, 9B, and 9C.

The parameters $c_x$, $c_y$, $e_x$, $e_y$, $e_{mx}$, $e_{my}$, and $e_{mz}$ are identified by iterative calculations. For the simplicity of description, the parameters $c_x$, $e_x$, $e_{mx}$, and $e_{mz}$ are identified by way of example. The other parameters $c_y$, $e_y$ and $e_{my}$ can be identified based upon the same principles.

Figure 9A:
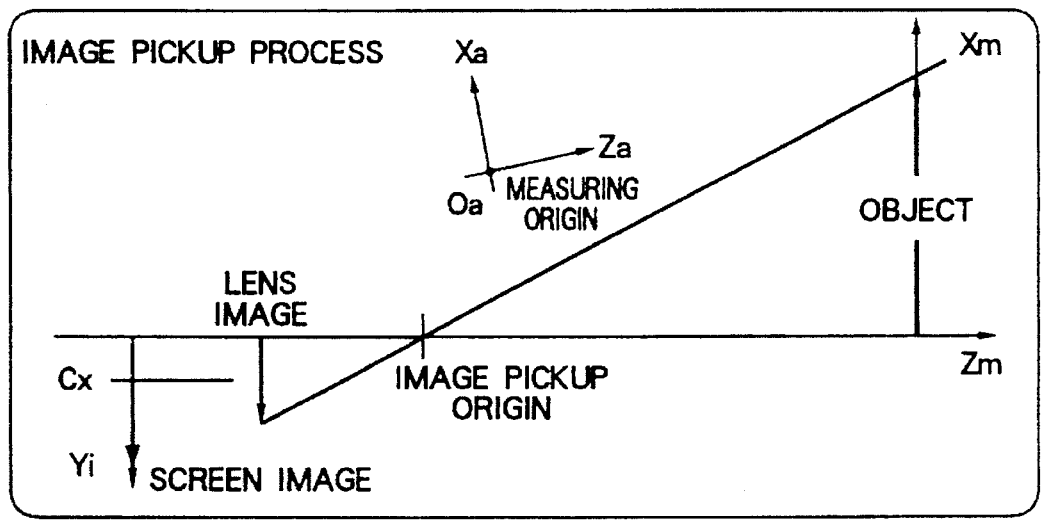
FIGS. 9A to 9C are diagrams illustrating the principle of identifying image pickup parameters to be used by the system shown in FIG. 1.

FIG. 9A illustrates the image pickup process wherein an object is displayed on the screen of the matching display unit. For the purpose of simplicity only the x-z relationship is illustrated.

The measuring origin is an origin of the measuring coordinate system, an image pickup origin is an origin of the camera coordinate system, a lens image is an object image on the light receiving device taken by a lens without any distortion, and a screen image is an object image on the screen. The iterative calculations are executed in the following sequence. First, an initial value 0 is assigned to $e_x$ to measure two sample objects.

One sample object is placed at a position near to the camera, and the other is placed at position far from the camera. The images of the sample objects will be displayed on the screen at the positions given by the following equations.

$$x_{i1} = c_x \frac{x_1 + e_{mx}}{z_1 + e_{mz}} + e_x \qquad \text{(Eq. 11)}$$

$$x_{i2} = c_x \frac{x_2 + e_{mx}}{z_2 + e_{mz}} + e_x \qquad \text{(Eq. 12)}$$

where $x_1$ and $z_1$ are x- and z-coordinates of the position of the sample object at the near position in the measuring coordinate system, $x_2$ and $z_2$ are x- and z-coordinates of the position of the sample object at the far position in the measuring coordinate system, and $x_{i1}$ and $x_{i2}$ are x-coordinates of the positions of the sample objects at the near and far positions in the screen coordinate system. The following relationships are satisfied between $c_x$ and $e_{mx}$ and between $c_x$ and $e_{mz}$.

$$e_{mx} = \frac{a_1}{c_x} + b_1 \qquad \text{(Eq. 13)}$$

$$e_{mz} = a_2 c_x + b_2 \qquad \text{(Eq. 14)}$$

where $$a_1 = -\frac{(z_1 - z_2)\{e_x^2 - (x_{i1} - x_{i2})e_x + x_{i1}x_{i2}\}}{x_{i1} - x_{i2}} \qquad \text{(Eq. 15)}$$

$$b_1 = -\frac{(x_1 - x_2)e_x + x_{i1}x_2 - x_{i2}x_1}{x_{i1} - x_{i2}} \qquad \text{(Eq. 16)}$$

$$a_2 = \frac{x_1 - x_2}{x_{i1} - x_{i2}} \qquad \text{(Eq. 17)}$$

$$b_2 = \frac{(z_1 - z_2) - x_{i1}z_1 + x_{i2}z_2}{x_{i1} - x_{i2}} \qquad \text{(Eq. 18)}$$

Figure 9B:
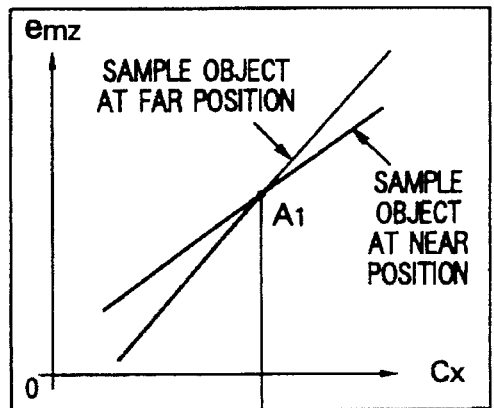
Figure 9C:
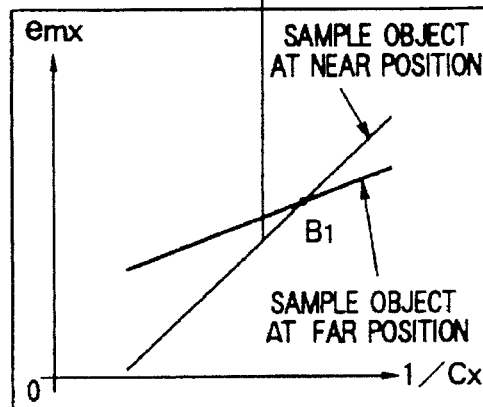

During the matching operation for the sample objects at the near and far positions with the magnification factor being changed, the equation (14) generates two straight lines as shown in FIG. 9B, and the equation (13) generates two straight lines as shown in FIG. 9C. If the initially assigned value of $e_x$ is a true value, the magnification factor $c_x$ at the cross point A1 of the two straight lines in FIG. 9B becomes equal to the magnification factor $c_x$ at the cross point B1 of the two straight lines in FIG. 9C. In other words, if the values $c_x$ are different, it means different values of $e_x$. From this viewpoint, if the values $c_x$ are different, the value $e_x$ is corrected by using the following equation.

$$e_x^{n+1} = e_x^n + c_x^n \frac{e_{mx1}(e_x^n) - e_{mx2}(e_x^n)}{z_{m1} - z_{m2}} \qquad \text{(Eq. 19)}$$

where $z_{m1}$ and $z_{m2}$ represent distances from the camera center to the sample objects, and n represents the number of iterative calculations. The calculations of the equation (11) and the succeeding equations are repeated by using the corrected $e_x$. If the iterative calculations converge the parameters $c_x$, $c_x$, $e_{mx}$, and $e_{mz}$ can be estimated. The other parameters $c_y$, $e_y$, and $e_{my}$ can be estimated by using the same principles.

Figure 10:
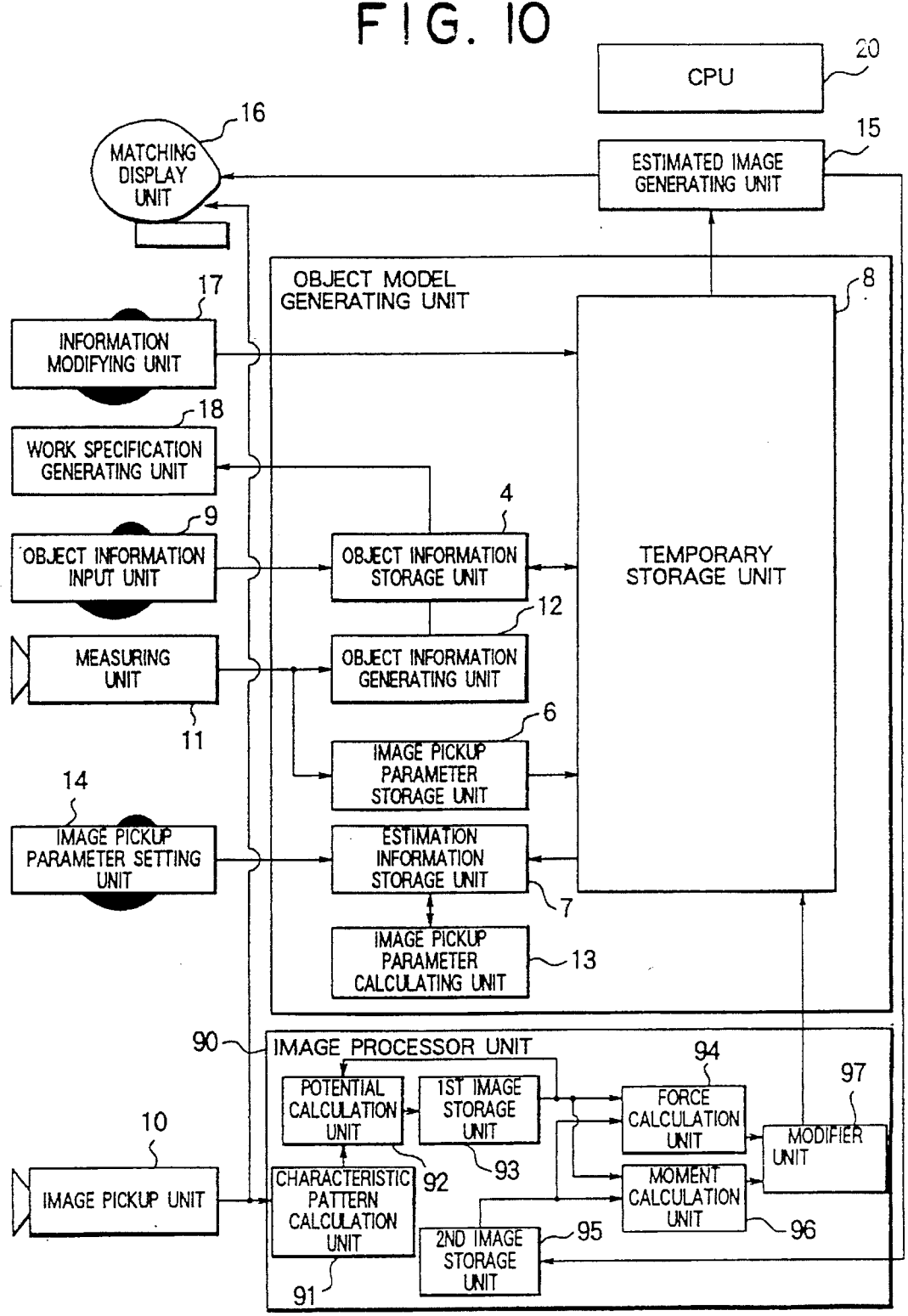
FIG. 10 is a block diagram showing another embodiment of a work support system according to the present invention.

FIG. 10 shows another embodiment of the work support system according to the present invention. In FIG. 10, like elements to those shown in FIG. 1 are represented by using identical reference numerals. In this embodiment, the pattern matching by the system shown in FIG. 1 is executed automatically. This automatic pattern matching can be realized by adding an image processing unit 90 interconnecting the estimated image generating unit 15 and temporary storage unit 8 of the system shown in FIG. 1.

The image processing unit 90 automatically modifies the contents (position and orientation of an object) stored in the temporary storage unit 8, in accordance with the image data inputted directly from the image pickup unit 10 or indirectly from the image storage unit 5 and the estimated image outputted from the estimated image generating unit 15. In the system of this embodiment, the position and orientation of an object stored in the temporary storage unit 8 are modified by both the information modifying unit 17 such as a mouse and the image processing unit 90. Both the image processing unit 90 and information modifying unit 17 may be operated at the same time. Namely, the correction values of the position and orientation outputted from the image processing unit 90 are added to the correction values of the position and orientation supplied from the information modifying unit 17 to modify the position and orientation of an object stored in the temporary storage unit 8.

The image processing unit 90 and information modifying unit 17 may be selectively operated. Namely, if there is an output from the information modifying unit 17 (e.g., moving a mouse while pushing its button), only this output is used for modifying the position and orientation of the object stored in the temporary storage unit 8. If there is no output from the information modifying unit 17 (e.g., the mouse button is not depressed), only an output from the image processing unit 90 is used for modifying the position and orientation of the object stored in the temporary storage unit 8.

Figure 11:
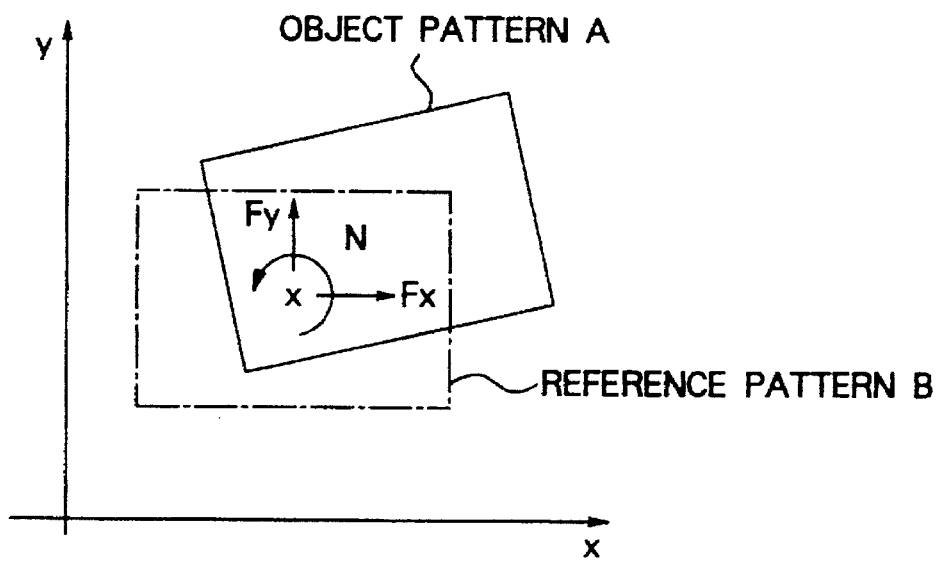
FIG. 11 is a diagram explaining the superposition principle to be used by the system shown in FIG. 10.

The image processing unit 90 is constructed of a characteristic pattern calculation unit 91, a potential calculation unit 92, a first image storage unit 93, a force calculation unit 94, a second image storage unit 95, a moment calculation unit 96, and a modifier unit 97. In accordance with the image data and estimated image, the image processing unit 90 calculates the correction amount of the position and orientation of an object. In accordance with the principle explained in FIG. 11, the image processing unit 90 matches the image data with the estimated image to calculate the correction amount of the position and orientation of an object. In FIG. 11, A represents an object pattern, and B represents a reference pattern, the reference pattern B being displaced from the object pattern A. The object and reference patterns A and B are represented by a function a (x, y) on the two-dimensional plane. Consider the two-dimensional potential field $\phi$ (x, y) defined by the following equation.

$$\frac{\partial^2 \phi}{\partial x^2} + \frac{\partial^2 \phi}{\partial y^2} + a(x,y) = 0 \quad \text{(Eq. 20)}$$

forces $F_x$ and $F_y$ and the moment N applied to the reference pattern B in the potential field are defined by the following equations.

$$F_x = \int_s b(x,y) \frac{\partial \phi}{\partial x} ds \quad \text{(Eq. 21)}$$

$$F_y = \int_s b(x,y) \frac{\partial \phi}{\partial x} ds \quad \text{(Eq. 22)}$$

$$N = \int_s b(x,y) \left\{ (x-x_0)\frac{\partial \phi}{\partial x} - (y-y_0)\frac{\partial \phi}{\partial y} \right\} ds \quad \text{(Eq. 23)}$$

where S represents the whole area on the image plane, and ($x_o$, $y_o$) represents the center of gravity of the reference pattern B.

The potential field $\phi$ (x, y) is analogous to the electric field generated by electric charges applied to the object pattern A. The forces $F_x$ and $F_y$ and moment N are analogous to the case where electric charges opposite in polarity to those of the object pattern A are applied to the reference pattern B. Accordingly, if the object pattern A and reference pattern B are in a generally superposed state, $F_x$, $F_y$, and N operate to superpose both the patterns in correct alignment with each other. Accordingly, the reference pattern B is displaced by (dx, dy) in the direction ($F_x$, $F_y$) and rotated by d$\Theta$ in the direction N about the center of gravity. Then, the calculation of $F_x$, $F_y$, and N is again executed. This operation is repeated until the object pattern A is completely superposed on the reference pattern B.

The characteristic pattern calculation unit 91 shown in FIG. 10 calculates, as the characteristic pattern, an edge pattern obtained by differentiating the image data. The calculated edge pattern corresponds to the estimated image generated by the estimated image generating unit 15 which is stored in the second image storage unit 95. If the position and orientation of an object stored in the temporary storage unit 8 are true values, the estimated image generated by the estimated image generating unit 15 coincides with the edge pattern. The potential calculation unit 92 calculates the potential field in accordance with an output (edge pattern) from the characteristic pattern calculation unit 91. In this calculation, a solution of the equation (20) may be calculated precisely. However, this calculation requires long time and labor. Therefore, the potential field is calculated approximately by the following subtraction operation.

$$U_{ij}^{t+1} = \frac{1}{4}(U_{i-1,j}^t + U_{i+1,j}^t + U_{i,j-1}^t + U_{i,j+1}^t) - ka_{ij}, i,j=2, 3, 4, \ldots, n-1 \quad \text{(Eq. 24)}$$

where $U_{ij}^t$ represents the calculation result of a pixel (i, j) at the t-th iterative calculation, $a_{ij}$ represents the value of a pixel (i, j) of the inputted edge pattern, and k is a constant. As the number of iterative calculations increases, the calculation result becomes near the solution of the equation (20). However, even with a small number of iterative calculations, a sufficient approximation to the solution can be obtained. If the images are consecutively inputted from the image pickup unit 10, the number of iterative calculations can be reduced by using the calculation result of the preceding image as the initial value. In the embodiment shown in FIG. 10, $U_{ij}^t$ is stored in the first image storage unit 93 and the iterative calculation is performed by using the loop of the potential calculation unit 92 and the first image storage unit 93.

The calculated potential field is stored in the first image storage unit 93. In accordance with the potential field stored in the first image storage unit 93 and the estimated image stored in the second image storage unit 95, the force calculation unit 94 and moment calculation unit 96 calculate the correction values of the parallel or rotary motion amount of the position and orientation of the object. The force calculation unit 94 calculates the forces $F_x$ and $F_y$ in the x- and y-directions by the following equations.

$$Fx_{ij} = \frac{1}{2}(U_{i+1j}^t - U_{i-1j}^t) \quad \text{(Eq. 25)}$$

$$Fy_{ij} = \frac{1}{2}(U_{ij+1}^t - U_{ij-1}^t) \quad \text{(Eq. 26)}$$

$$Fx = \sum_{i=2}^{n-1} \sum_{j=2}^{n-1} Fx_{ij} \cdot b_{ij} \quad \text{(Eq. 27)}$$

$$Fy = \sum_{i=2}^{n-1} \sum_{j=2}^{n-1} Fy_{ij} \cdot b_{ij} \quad \text{(Eq. 28)}$$

The moment calculation unit 96 calculates the moment by the following equation.

$$N = \sum_{i=2}^{n-1} \sum_{j=2}^{n-1} \{(i - i_0) \cdot Fy_{ij} - (j - j_0) \cdot Fx_{ij}\} \cdot b_{ij} \quad \text{(Eq. 29)}$$

where $b_{ij}$ represents the value of a pixel (i, j) of the reference pattern B, and $i_0$ and $j_0$ represent the pixel position corresponding to the center of gravity of the reference pattern B.

Figure 12:
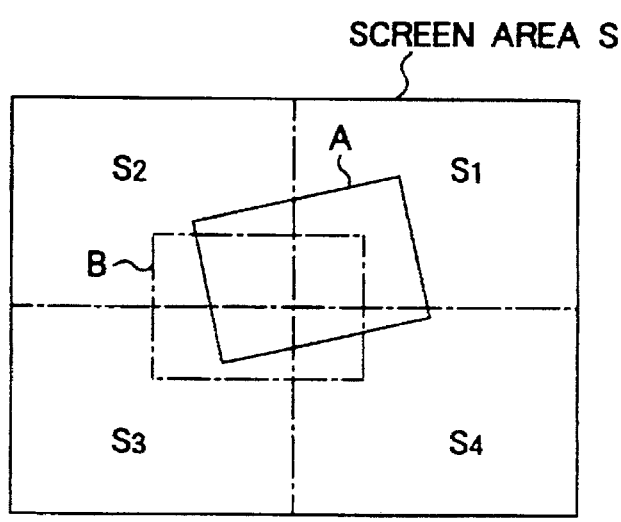
FIG. 12 is a diagram explaining the approximation calculation of a moment to be used by the system shown in FIG. 10.

If the reference pattern B is generally at the center of the screen, the moment can be approximated in the following manner. Namely, the screen S is divided into four areas $S_1$, $S_2$, $S_3$, and $S_4$ as shown in FIG. 12. The forces $F_{x1}, F_{x2}, F_{x3}, F_{x4}, F_{y1}, F_{y2}, F_{y3}, F_{y4}$ applied to the reference pattern B at the respective areas in the x- and y-directions are given by the following equations.

$$\left. \begin{array}{ll} Fx_1 = \sum\limits_{i,j \in S_1} Fx_{ij}, & Fy_1 = \sum\limits_{i,j \in S_1} Fy_{ij} \\ Fx_2 = \sum\limits_{i,j \in S_2} Fx_{ij}, & Fy_2 = \sum\limits_{i,j \in S_2} Fy_{ij} \\ Fx_3 = \sum\limits_{i,j \in S_3} Fx_{ij}, & Fy_3 = \sum\limits_{i,j \in S_3} Fy_{ij} \\ Fx_4 = \sum\limits_{i,j \in S_4} Fx_{ij}, & Fy_4 = \sum\limits_{i,j \in S_4} Fy_{ij} \end{array} \right\} \quad \text{(Eq. 30)}$$

Therefore, the moment N can be approximated by the following equation.

$$N = -Fx_1 + Fy_1 - Fx_2 - Fy_2 + Fx_3 - Fy_3 - Fy_3 + Fx_4 + Fy_4 \quad \text{(Eq. 31)}$$

The number of divisions is not limited to four, and any number of two or more may be used. Even if the number of divisions is not increased greatly, a sufficient approximation precision can be obtained so that the number of divisions may be determined based upon a tradeoff between the calculation speed and the precision.

The modifier unit 97 calculates the correction values dx and dy of an object position and the correction amount $d\Theta$ of the object orientation by the following equations, in accordance with $F_x$, $F_y$, and N.

$$\left. \begin{array}{ll} dx = \begin{cases} \alpha & (F_x > 0) \\ 0 & (F_x = 0) \\ -\alpha & (F_x < 0) \end{cases} \\ dy = \begin{cases} \alpha & (F_y > 0) \\ 0 & (F_y = 0) \\ -\alpha & (F_y < 0) \end{cases} \\ d\Theta = \begin{cases} \beta & (n > 0) \\ 0 & (N = 0) \\ -\beta & (N < 0) \end{cases} \end{array} \right\} \quad \text{(Eq. 32)}$$

Next, the operation of the image processing unit 90 will be described.

First, a potential field $U_{ij}^t = 0$ is stored in the first image storage unit 93. As the images of the object start being inputted from the image pickup unit 10, the characteristic pattern calculation unit 91 generates as the object pattern the edge pattern. The potential calculation unit repeats the calculation, and outputs the potential field to the first image storage unit 93. The initial position and orientation of the object are stored in the second image storage unit 95. In accordance with the data in the first and second image storage units 93 and 95, the force calculation unit 94 and moment calculation unit 96 calculate the moment and forces. In accordance with the calculated moment and forces, the modifier unit 97 modifies the position and orientation of the object.

A reference pattern generated based upon the modified position and orientation is stored in the second image storage unit 95. The above operations are repeated so that the reference pattern is superposed more and more just on the object pattern or edge pattern. A judgement whether or not the superposition has been completed is made by checking, for example, whether the average of the correction values of the position and orientation at an arbitrary calculation number has become almost 0.

In the above description, the optical axis of the camera is not always necessary to be positioned just above the object, but it may be positioned obliquely. In this case, the object pattern and reference pattern may not become congruent. However, the qualitative directions of forces applied to the two patterns are maintained, allowing the superposition.

Figure 13:
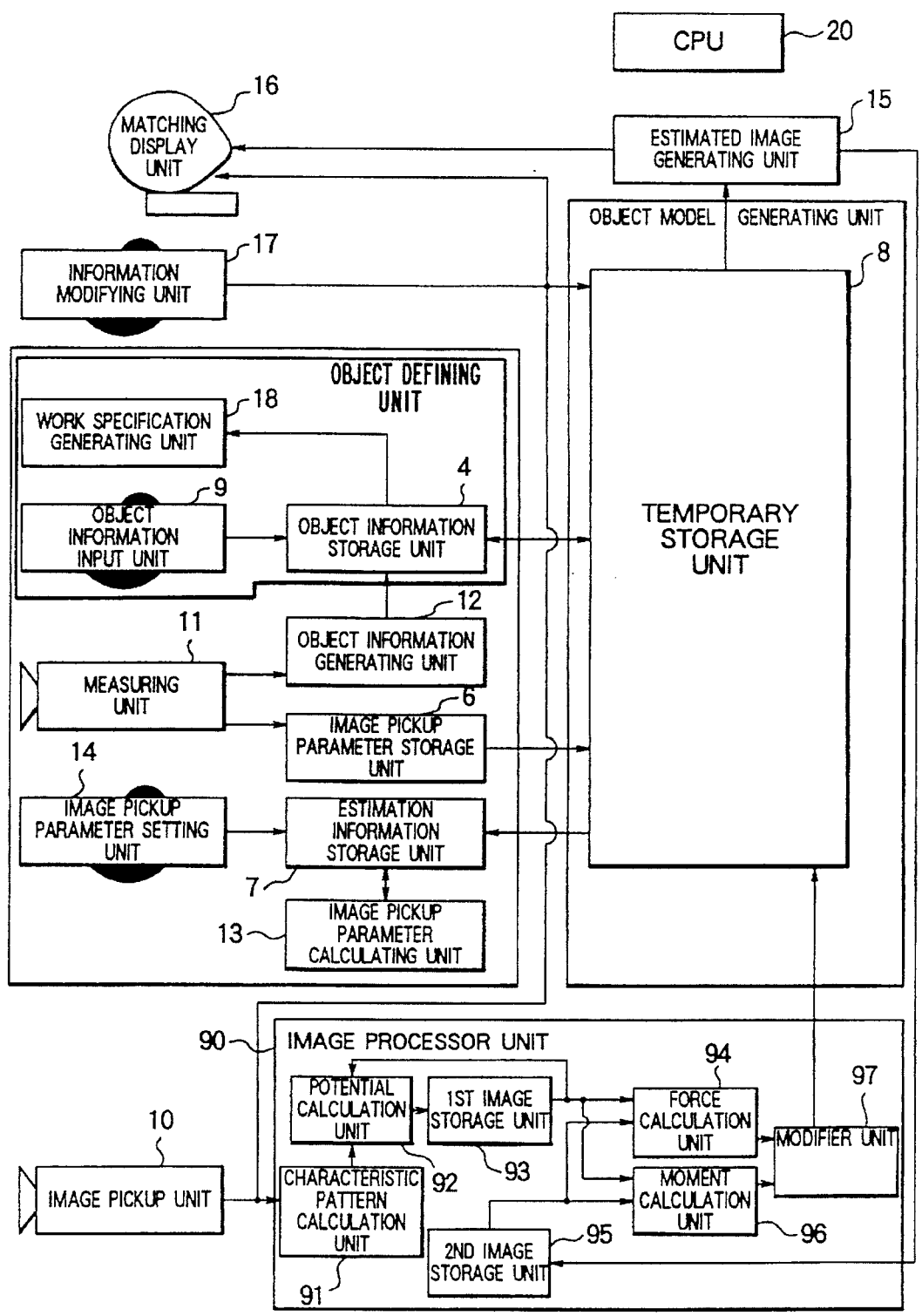
FIG. 13 is a block diagram showing another embodiment of a work support system according to the present invention.

FIG. 13 shows another embodiment of the work support system according to the present invention. In this embodiment, an object defining unit constructed of the work specification generating unit 18, object information input unit 9, and object information storage unit 4 is built in, or connected via a network to, the work support system. The image pickup parameters are assumed in this embodiment to have been already identified.

With the object defining unit, the measuring unit for measuring the position and orientation of an object can be made more compact. Various objects are measured often during construction work by using the same image pickup unit. Therefore, the object defining unit constructed as above can be used sufficiently under such an environment.

Figure 14:
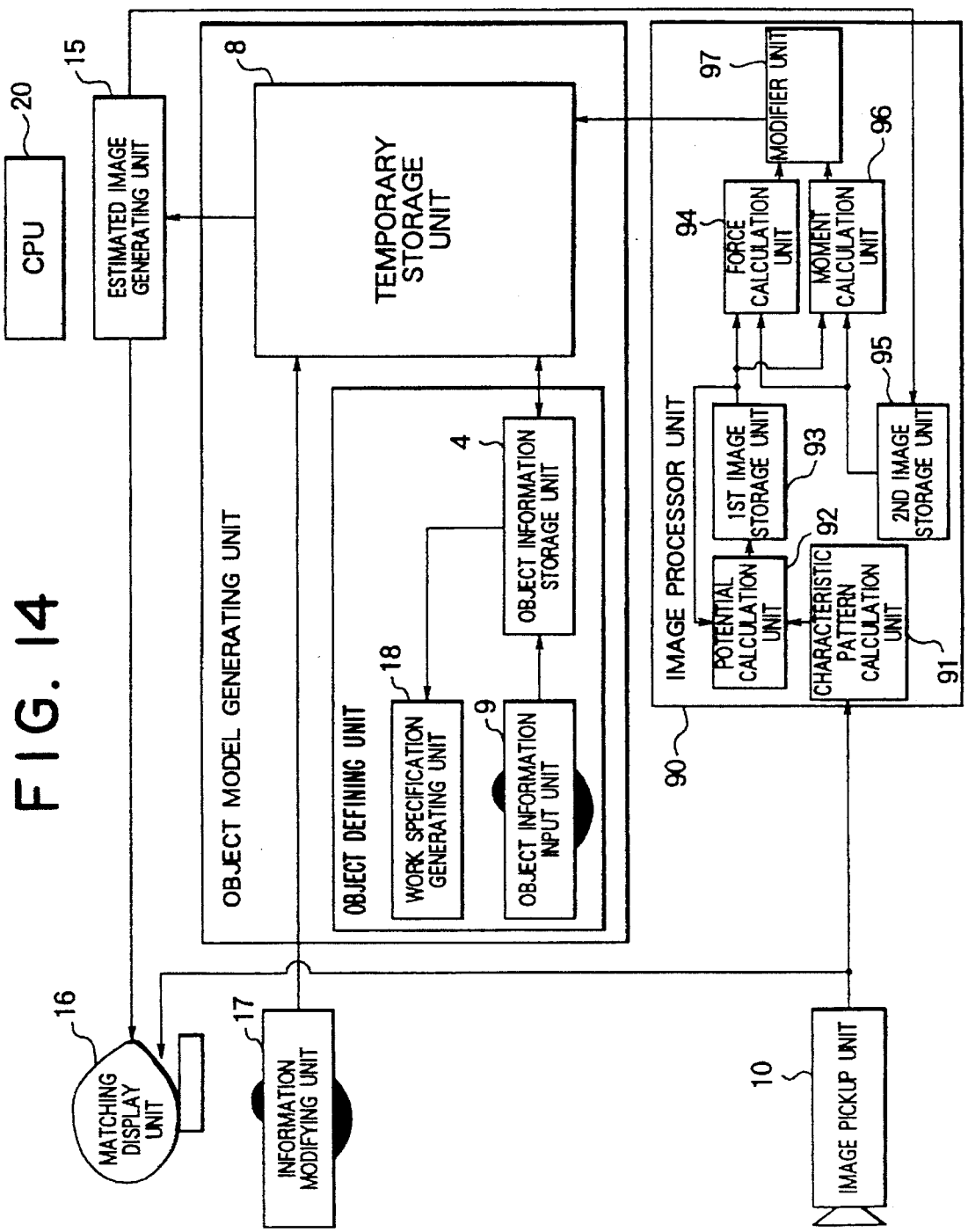
FIG. 14 is a block diagram showing another embodiment of a work support system according to the present invention.

FIG. 14 shows another embodiment of the work support system according to the present invention. In this embodiment, the cooperation of the information modifying unit 17 and image processing unit 90 allows the object model to be generated efficiently and reliably. The pertinence of the generated object model is always displayed on the matching display unit 16.

The object model generating unit may be structured as a recognition type computer. With this computer, the information modifying unit 17 is preferentially used for modifying the object model.

Use of such a computer providing both the operability and visibility is very effective for providing both the reliability and efficiency in complicated work such as construction work.

In the above embodiments, an object of a structure has been used by way of example. Objects may be vehicles such as motor cars and electric cars, ships, air planes, cargo handling machines such as cranes, rolling machines, compressors, mechanical machines such as turbines, atomic reactors, robots, working machines such as processing machines, and space stations. If such objects are to be manufactured through computer integrated manufacturing (CIM), the object information storage unit 4 may be used as the database of such objects to be managed by the CIM system. The system of the present invention can thus be used with the CIM system. Magnetic floating coils may be used as the object to rationalize the mounting work of magnetic floating coils. An elevator may be used as the object to rationalize the installation and replacement of elevators.

For example, in the case where cargo in a marketing system is used as the object, the work specification generating unit 18 shown in FIG. 1 may be replaced by a cargo transport unit such as a robot and a guiding unit. In accordance with the design information stored in the object information storage unit 4, the position and orientation of the cargo, and an instruction from an operator, the guiding unit determines operation information for the cargo transport unit and transfers it to the cargo transport unit. In accordance with the operation information supplied from the guiding unit, the cargo transport unit can load and unload the cargo on and from a truck. The loading and unloading work can be performed simply by supplying an instruction to the guiding unit. An operator can therefore be relieved of hard work while reducing the time required for the work.

What is claimed is:

1. A computer aided work support system comprising:

measuring means for measuring position and orientation of said measuring means in a coordinate system defined with respect to a reference point which is used to determine position and orientation of a second object to be measured and a position of a point on a reference first object which is used to estimate part of image pickup parameters;

image pickup means for picking up images of said first object and said second object, said image pickup means and said measuring means having a fixed spatial relationship therebetween;

storage means for storing information of form, position, and orientation of one of said first and second objects, and image pickup parameters such as position and orientation of said measuring means, relative position and orientation of said image pickup means to said measuring means, a plurality of image magnification factors, and a position of an optical axis of said image pickup means on a screen of display means;

input means for inputting the form, position, and orientation of one of said first and second objects into said storage means;

calculation means for calculating position and orientation of said measuring means, relative position and orientation of said image pickup means to said measuring means, and position of the optical axis of said image pickup means on the screen of said display means, respectively for each of said plurality of image magnification factors, in accordance with the relative position of said image pickup means to said measuring means;

means for generating an estimated image of one of said first and second objects in accordance with calculation results by said calculation means and said information stored in said storage means;

said display means for displaying an image picked up by said image pickup means and said estimated image in a superposed manner at the same time on the screen of said display means; and means for detecting a displacement amount of said estimated image from said picked-up image displayed on said display means, converting said displacement amount into a change amount of the position and orientation of one of said second object and said image pickup means, and adding said change amount to data of the position and orientation of one of said second object and said image pickup means stored in said storage means.

2. A computer aided work support system according to claim 1, further comprising means for generating a work specification in accordance with the information of the form, position, and orientation of said second object stored in said storage means.

3. A computer aided work support system according to claim 1, further comprising:

working means for performing a work in accordance with inputted information;

means for determining operation information for said working means in accordance with the information of the form, position, and orientation of said second object stored in said storage means and an instruction from an operator; and means for transferring said operation information to said working means.

4. A computer aided work support system according to claim 1, further comprising means for storing an image picked up by said image pickup means.

5. A computer aided work support system according to claim 1, further comprising:

cargo transport means for loading, unloading, and transporting a cargo;

means for determining operation information for said cargo transport means in accordance with the information of the form, position, and orientation of said second object stored in said storage means and an instruction from an operator; and means for transferring said operation information to said cargo transport means.

6. A computer aided work support system comprising:

image pickup means for picking up the image of an object;

storage means for storing information of form, three-dimensional position, and three-dimensional orientation of said object, three-dimensional position and three-dimensional orientation of said image pickup means, an image magnification factor, and a position of an optical axis of said image pickup means on a screen of display means;

means for generating an estimated image of said object in accordance with information stored in said storage means;

said display means for displaying an image picked up by said image pickup means and said estimated image in a superposed manner at the same time on the screen of said display means; and means for detecting a signal entered by an operator, converting said signal into a change amount of the three-dimensional position and the three-dimensional orientation of one of said object and said image pickup means, and adding said change amount to data of the three-dimensional position and the three-dimensional orientation of said object stored in said storage means.

7. A computer aided work support system comprising:

measuring means for measuring position and orientation of said measuring means in a coordinate system defined with respect to a reference point which is used to determine position and orientation of an object to be measured;

image pickup means for picking up an image of said object, said image pickup means and said measuring means having a fixed spatial relationship therebetween;

storage means for storing information of form, position, and orientation of said object, relative position and orientation of said image pickup means to said measuring means, an image magnification factor, and a position of an optical axis of said image pickup means on a screen of display means;

means for generating an estimated image of said object in accordance with information stored in said storage means;

said display means for displaying the image picked up by said image pickup means and said estimated image in a superposed manner at the same time on the screen of said display means; and means for detecting a signal entered by an operator, converting said signal into a change amount of the position and orientation of one of said object and said image pickup means, and adding said change amount to data of the position and orientation of said object stored in said storage means.

8. A computer aided work support system comprising:

image pickup means for picking up an image of an object to be measured;

means for generating an estimated image of said object in accordance with position and orientation of said image pickup means, an image magnification factor, and a position of an optical axis of said image pickup means on a screen of display means;

storage means for storing information of position and orientation of said object, position and orientation of said image pickup means, said image magnification factor, and a position of an optical axis of said image pickup means on the screen of said display means;

information modifying means for modifying the position and orientation of said object stored in said storage means;

means for generating an edge pattern in accordance with an image picked up by said image pickup means;

means for calculating a potential in accordance with said edge pattern; and means for calculating a correction amount for position and orientation of said object in accordance with said estimated image and said potential, and adding said correction amount to the position and orientation of said object stored in said storage means if said information modifying means has not modified information stored in said storage means.

9. A computer aided work support method comprising the steps of:

picking up an image of an object to be measured by using image pickup means;

measuring position and orientation of measuring means in a coordinate system defined with respect to a reference point which is used to determine position and orientation of said object at a time when said image is picked up by said image pickup means[,]by using said measuring means itself while maintaining a fixed spatial relationship between said image pickup means and said measuring means;

generating an estimated image of said object in accordance with design information of said object stored in advance in storage means, an image pickup parameter to be used for displaying said object on a screen of display means, and information of the position and orientation of said measuring means obtained at said measuring step;

displaying said estimated image and the image of said object picked up by said image pickup means on the screen of said display means in a superposed manner at the same time;

moving said estimated image by inputting a signal to information modifying means to superpose said estimated image upon the image of said object, and measuring position and orientation of said object; and storing measured data of the position and orientation of said object in said storage means.

10. A computer aided work support method according to claim 9, further comprising the step of generating a work specification in accordance with said design information and the information of the position and orientation of said object obtained at said measuring step.

11. A computer aided work support method according to claim 9, further comprising the steps of:

determining operation information of working means in accordance with said design information and the position and orientation of said object obtained at said measuring step; and performing a work by inputting said operation information to said working means.

12. A computer aided work support method according to claim 9, further comprising the step of using the measured data of the position and orientation of said object as the design data for an architecture.

13. A computer aided work support method according to claim 9, wherein said estimated image generating step includes a step of entering, as said image pickup parameter, information of relative position and orientation of said image pickup means to said measuring means, an image magnification factor of a whole image pickup system, and a position of an optical axis of said image pickup means on a screen of said display means.

14. A computer aided work support method according to claim 9, wherein said displaying step in a superposed manner includes a step of selecting a motion direction of said estimated image by using said information modifying means.

15. A computer aided work support method comprising the steps of:

displaying an image of an object picked up by image pickup means;

generating an estimated image of said object;

displaying said estimated image and said picked-up image on a screen of display means at the same time;

moving said estimated image by inputting a signal to information modifying means to superpose said estimated image upon said picked-up image; and measuring three-dimensional position and three-dimensional orientation of said object from an amount of motion of said estimated image superposed on said picked-up image.

* * * * *